(12) United States Patent
Guo et al.

(10) Patent No.: US 11,416,499 B1
(45) Date of Patent: Aug. 16, 2022

(54) VERTICAL CUCKOO FILTERS

(71) Applicant: National University of Defense Technology, Hunan (CN)

(72) Inventors: Deke Guo, Hunan (CN); Lailong Luo, Hunan (CN); Pengtao Fu, Hunan (CN); Yi Wang, Hunan (CN); Long Zheng, Hunan (CN); Yahui Wu, Hunan (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 17/499,699

(22) Filed: Oct. 12, 2021

(51) Int. Cl.
*G06F 16/2455* (2019.01)
*G06F 16/901* (2019.01)

(52) U.S. Cl.
CPC .... *G06F 16/24568* (2019.01); *G06F 16/9014* (2019.01)

(58) Field of Classification Search
CPC ...................... G06F 16/24568; G06F 16/9014
See application file for complete search history.

(56) References Cited

U.S. PATENT DOCUMENTS

| | | | | |
|---|---|---|---|---|
| 10,853,422 | B2 * | 12/2020 | Laine | G06F 16/90335 |
| 2019/0065557 | A1 * | 2/2019 | Boles | G06F 16/9014 |
| 2019/0205244 | A1 * | 7/2019 | Smith | G06F 12/12 |
| 2019/0266252 | A1 * | 8/2019 | Breslow | G06F 16/2255 |
| 2020/0167327 | A1 * | 5/2020 | Breslow | G06F 3/0689 |
| 2021/0034674 | A1 * | 2/2021 | Palsetia | G06F 16/9017 |
| 2021/0117100 | A1 * | 4/2021 | Breslow | G06F 12/0864 |
| 2021/0117487 | A1 * | 4/2021 | Cole | G06F 16/9538 |

FOREIGN PATENT DOCUMENTS

| | | | | |
|---|---|---|---|---|
| CA | 112148928 A | * | 12/2020 | G06F 16/901 |
| CA | 113535706 A | * | 12/2020 | G06F 16/215 |
| CN | 112148928 A | * | 12/2020 | G06F 16/901 |

OTHER PUBLICATIONS

Xiaozhou Li, Algorithmic Improvements for Fast Concurrent Cuckoo Hashing , pp. 1-7 (Year: 2014).*

* cited by examiner

*Primary Examiner* — Matthew J Ellis
(74) *Attorney, Agent, or Firm* — Dragon Sun Law Firm, PC; Jinggao Li, Esq.; Nathaniel Perkins

(57) ABSTRACT

A system for streaming data items of a streaming application via a Vertical Cuckoo Filter (VCF), including: one or more computers communicating with a provider via a network; wherein the one or more computers includes: a processor; and a storage device coupled to the processor, wherein the storage device is configured to store the VCF, an insert module, a lookup module, and a delete module, the VCF includes buckets with one or more slots and includes at least two bitmasks, the insert module is configured to perform an insert operation of a first fingerprint of a first item from the provider on the VCF, the lookup module is configured to perform a lookup operation of a second fingerprint of a second item from the provider on the VCF, the delete module is configured to perform a delete operation of a third fingerprint of a third item from the VCF.

18 Claims, 14 Drawing Sheets

VERTICAL CUCKOO FILTERS

TECHNICAL FIELD

The present disclosure relates to the field of streaming applications, and more particularly relates to a system and method for using a vertical cuckoo filter to enhance streaming applications.

BACKGROUND

Many caches, routers and storage systems in networking and distributed systems, rely on space-efficient data structures to decide whether a given item exists in a large set of items. Bloom filter (BF) [1] and its variants are well-known data structures, and provide high memory efficiency at the cost of a few false positives. However, standard Bloom filters cannot delete existing items without rebuilding the entire filter. Variants of the standard BF, including Counting Bloom filters (CBF) [2], d-left counting Bloom filters (dlCBF) [3], quotient filters [4], TinySet, etc., have been developed to improve these deficiencies. These efforts, however, often suffer from degradation in either space or time efficiency, though Rank-Indexed Hashing makes a minor improvement on space-saving.

To this end, the Cuckoo filter (CF) [5] was proposed for better space utilization and faster deletion as a light-weight probabilistic data structure. Unlike Bloom filters, CF directly stores the item fingerprints in two candidate buckets. If both candidates are fully occupied, CF evicts a stored fingerprint from the candidate buckets to accommodate the item to be inserted, while reallocating the victim to an alternative bucket. Such a reallocation process is successful if no more victims are generated, or unsuccessful if the number of reallocations reaches a given threshold. Efforts have been made to further improve its performance in terms of false positive rate (Adaptive Cuckoo filter [6]), flexibility (the consistent Cuckoo filter [7]), key set extension (Dynamic Cuckoo filter [8]), theoretical guarantee (the simplified Cuckoo filter [9]), lookup throughput (Vacuum filter [10], Morton filter [11]), etc.

However, the improved Cuckoo filters typically rely on the reallocation process for higher space utilization resulting in time-consuming item insertion, especially when the improved Cuckoo filter is nearly full [12]. Such designs are not friendly for insertion-intensive online applications where items are frequently inserted and deleted. An intuitive insight, as stated in D-ary Cuckoo filter (DCF) [13], is to utilize more candidate buckets so that the filter may find an empty bucket slot without reallocation. Nevertheless, d-ary cuckoo hashing is cumbersome as a significant amount of calculation overhead and time consumption are caused in the insertion, lookup, and deletion processes.

Therefore, a heretofore unaddressed need exists in the art to address the aforementioned deficiencies and inadequacies.

SUMMARY

Cuckoo filter (CF) and its variants are emerging as replacements of Bloom filters in various networking and distributed systems to support efficient set representation and membership testing. Cuckoo filters store item fingerprints directly with two candidate buckets, and a reallocation scheme is implemented to mitigate the bucket overflow problem for higher space utilization. Such a reallocation scheme, once triggered, however, may be time-consuming. This shortcoming makes the existing CFs not applicable for insertion-intensive scenarios such as online applications wherein items are frequently inserted and deleted. To this end, a Vertical Cuckoo filter (VCF) is disclosed herein, which extends the standard Cuckoo filter by providing more candidate buckets for each item. Another challenging issue with such a design is how to ensure that the candidate buckets may be indexed by each other such that no additional hash computation and item access are necessary during fingerprint reallocation. Therefore, vertical hashing is presented, which indexes the candidate buckets with the fingerprint and given bitmasks. VCF is further generalized and improved by realizing k ($\geq$4) candidate buckets while avoiding unnecessary computation. Comprehensive experiments have been conducted, indicating that VCF outperforms its same kinds in terms of space utilization and insertion throughput, with a slight compromise of lookup speed.

In one embodiment, a system for streaming data items of a streaming application via a Vertical Cuckoo Filter (VCF), is described, The system includes: one or more computers communicating with a provider via a network; wherein the one or more computers includes: a processor; and a storage device coupled to the processor, wherein the storage device is configured to store the VCF, an insert module, a lookup module, and a delete module, the VCF comprises buckets with one or more slots and comprises at least two bitmasks, the insert module is configured to perform an insert operation of a first fingerprint of a first item from the provider on the VCF, the lookup module is configured to perform a lookup operation of a second fingerprint of a second item from the provider on the VCF, the delete module is configured to perform a delete operation of a third fingerprint of a third item from the VCF, four or more candidate buckets are associated with each item of the first item, the second item, and the third item, the four or more candidate buckets are determined based on the at least two bitmasks, a first hash of the first item, the second item, and the third item, and a second hash of the first fingerprint, the second fingerprint, and the third fingerprint, and the VCF utilizes vertical hashing to implement cyclical access to the four or more candidate buckets, thereby improving a reallocation process of the insertion operation by reducing a number of hash computations required by item insertion.

In another embodiment, the insert operation includes: calculating the first fingerprint; determining a first set of four candidate buckets of the first item; and inserting the first fingerprint into an empty slot of a candidate bucket of the first set.

In another embodiment, the first set of four candidate buckets is determined according to:

$$B_1(x) = \text{hash}(x),$$

$$B_2(x) = B_1(x) \oplus \text{hash}(\eta_x) \wedge \text{bm}_1,$$

$$B_3(x) = B_1(x) \oplus \text{hash}(\eta_x) \wedge \text{bm}_2,$$

$$B_4(x) = B_1(x) \oplus \text{hash}(\eta_x),$$

where x is the first item, $B_1(x)$, $B_2(x)$, $B_3(x)$ and $B_4(x)$ are the candidate buckets, $\eta_x$ is the first fingerprint, $\text{bm}_1$ is a first bitmask, $\text{bm}_2$ is a second bitmask, $\oplus$ is an XOR operator, and $\wedge$ is an AND operator.

In another embodiment, the insert operation further includes: determining that each candidate bucket of the first set is full; randomly selecting a target candidate bucket from the first set; randomly selecting a target slot from the target candidate bucket; removing a victim fingerprint associated with a victim item from the target slot; inserting the first fingerprint into the target slot; and reallocating the victim fingerprint according to the reallocation process; wherein the reallocating includes: determining a victim set of four candidate buckets; and performing the insert operation with the victim fingerprint and the victim set.

In another embodiment, the victim set of four candidate buckets is determined according to:

$B_m = B_i \oplus \text{hash}(\eta_x) / \backslash bm_1,$ $B_n = B_i \oplus \text{hash}(\eta_x) / \backslash bm_2,$ $B_j = B_i \oplus \text{hash}(\eta_x),$ where $B_i$ is the target candidate bucket, $\eta_x$ is the victim fingerprint, $B_m$, $B_n$ and $B_j$ are candidate buckets of the victim set, $bm_1$ is the first bitmask, $bm_2$ is the second bitmask, $\oplus$ is the XOR operator, and $\wedge$ is the AND operator.

In another embodiment, the lookup operation includes: calculating the second fingerprint; determining a second set of four candidate buckets of the second item; searching the second set for the second fingerprint; and returning a result of the searching.

In another embodiment, the delete operation includes: calculating the third fingerprint; determining a third set of four candidate buckets of the third item; searching the third set for the third fingerprint; and removing a copy of the third fingerprint from the VCF.

In another embodiment, more than four candidate buckets are associated with the each item.

In another embodiment, the more than four candidate buckets are determined according to:

$B_1(x) = \text{hash}(x),$ $B_2(x) = B_1(x) \oplus \text{hash}(\eta_x) / \backslash bm_1,$ $B_3(x) = B_1(x) \oplus \text{hash}(\eta_x) / \backslash bm_2,$ $B_{k-1}(x) = B_1(x) \oplus \text{hash}(\eta_x) / \backslash bm_{k-2},$ $B_k(x) = B_1(x) \oplus \text{hash}(\eta_x),$ where $B_{k-1}(x)$ is a second to last candidate bucket, $B_k(x)$ is a last candidate bucket, and $bm_{k-2}$ is a last bitmask.

In another embodiment, the first bitmask is an inverse of the second bitmask.

In another embodiment, the first bitmask is 11110000 and the second bitmask is 00001111.

the first bitmask comprises 1 0s and the second bitmask comprises f–1 0s, where f is the length of the first fingerprint.

In another embodiment, a value range of the hash($\eta_x$) is separated into a first interval and a second interval according to a threshold.

In another embodiment, the first interval comprises [T/2–Δt, T/2+Δt] and the second interval comprises [0, T/2–Δt] ∪ [T/2+Δt, T], where T is the length of the value range of the hash($\eta_x$) and Δt is the threshold.

In another embodiment, when the first fingerprint lies in the second interval and the input module is further configured to determine a first set of two candidate buckets and insert the first fingerprint into a candidate bucket of the first set of two candidate buckets.

In another embodiment, the second fingerprint lies in the second interval and the lookup module is further configured to determine a second set of two candidate buckets and search the second set of two candidate buckets for the second fingerprint.

In another embodiment, when the third fingerprint lies in the second interval and the delete module is further configured to determine a third set of two candidate buckets and delete the third fingerprint from a candidate bucket of the third set of two candidate buckets.

In another embodiment, the first fingerprint, the second fingerprint, and the third fingerprint are calculated according to $\eta_x = h_0(x) \bmod 2^f,$ where $\eta_x$ is the first fingerprint, the second fingerprint, or the third fingerprint, $h_0(x)$ is a hash of the first item, the second item, or the third item, and f is the length of the first fingerprint, the second fingerprint, or the third fingerprint.

In another embodiment, the four or more candidate buckets are circularly accessible.

In another embodiment, the VCF utilizes Fowler-Noll-Vo (FNV) hash.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference is individually incorporated by reference. In terms of notation, hereinafter, [n] represents the nth reference cited in the reference list. For example, [1] represents the first reference cited in the reference list, namely, GMSA, "GSMA intelligence," https://www.gsmaintelligence.com/, Accessed On: February 2019.

BRIEF DESCRIPTION OF THE DRAWINGS

The accompanying drawings illustrate one or more embodiments of the present disclosure and, together with the written description, serve to explain the principles of the present disclosure, wherein:

FIG. 3A-3B illustrate an exemplary VCF insertion, wherein FIG. 3A shows a VCF before inserting item x and FIG. 3B shows a VCF after inserting item x, in accordance with an embodiment of the present disclosure;

FIGS. 4A-4B illustrate an exemplary k-VCF insertion, wherein FIG. 3A shows a k-VCF before inserting item x and FIG. 3B shows a k-VCF after inserting item x, in accordance with an embodiment of the present disclosure;

FIGS. 6A-6C illustrate exemplary graphs showing load factor, wherein FIG. 6A shows load factors of IVCF, FIG. 6B shows load factors of DVCF, and FIG. 6C shows a comparison between IVCF and DVCF, in accordance with an embodiment of the present disclosure;

FIGS. 7A-7B illustrate exemplary graphs of lookup time, wherein FIG. 7A shows lookup time for existing items and FIG. 7B shows lookup time for mixed items, in accordance with an embodiment of the present disclosure;

FIGS. 8A-8C illustrate exemplary graphs of insert time, wherein FIG. 8A shows insert time of IVCF, FIG. 8B shows insert time of DVCF, and FIG. 8C shows a comparison between insert times of IVCF and DVCF, in accordance with an embodiment of the present disclosure;

DETAILED DESCRIPTION

Figure 1:
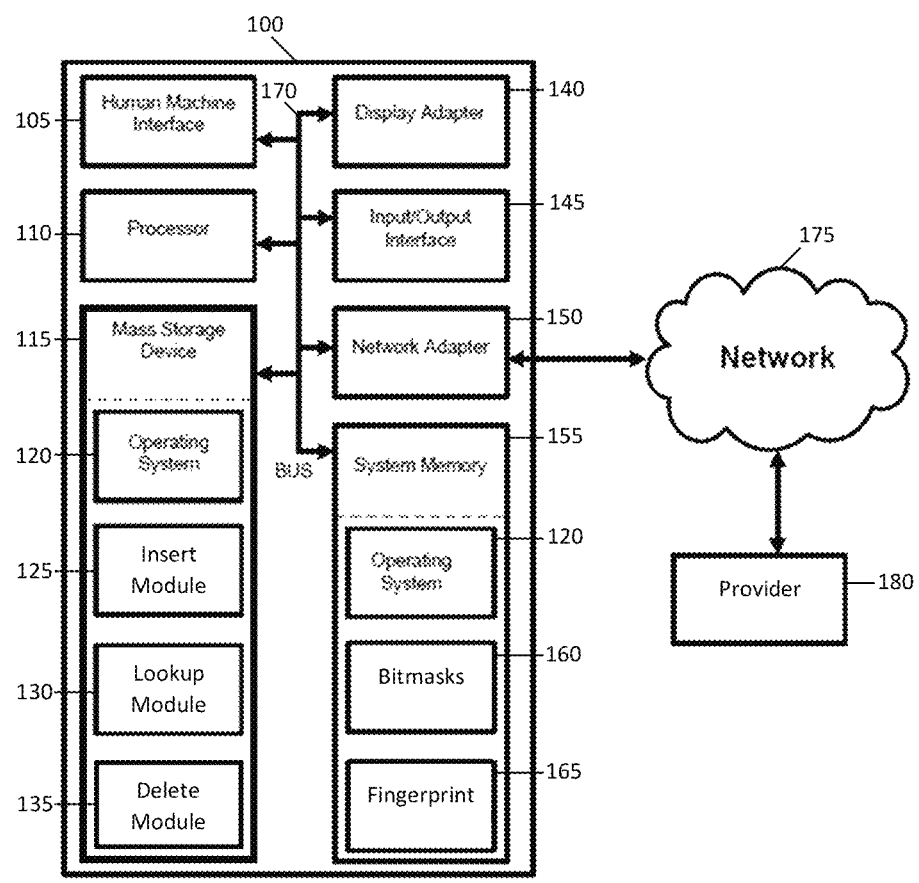
FIG. 1 is a block diagram illustrating an exemplary computing system in which the present system and method may operate, in accordance with an embodiment of the present disclosure.

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the present disclosure to those skilled in the art. Like reference numerals refer to like elements throughout.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It is appreciated that the same thing may be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the present disclosure or of any exemplified term. Likewise, the present disclosure is not limited to various embodiments given in this specification.

It is understood that when an element is referred to as being "on" another element, it may be directly on the other element or intervening elements may be present therebetween. In contrast, when an element is referred to as being "directly on" another element, there are no intervening elements present. As used herein, the term "and/or" includes any and all combinations of one or more of the associated listed items.

It is understood that, although the terms Firstly, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below may be termed a second element, component, region, layer or section without departing from the teachings of the present disclosure.

It is understood that when an element is referred to as being "on," "attached" to, "connected" to, "coupled" with, "contacting," etc., another element, it may be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It is also appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the present disclosure. As used herein, the singular forms "a," "an," and "the" are intended to include the multiple forms as well, unless the context clearly indicates otherwise. It is further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It is understood that relative terms are intended to encompass different orientations of the device in addition to the orientation shown in the figures. For example, if the device in one of the figures is turned over, elements described as being on the "lower" side of other elements will then be oriented on the "upper" sides of the other elements. The exemplary term "lower" may, therefore, encompass both an orientation of lower and upper, depending on the particular orientation of the figure. Similarly, for the terms "horizontal", "oblique" or "vertical", in the absence of other clearly defined references, these terms are all relative to the ground. Similarly, if the device in one of the figures is turned over, elements described as "below" or "beneath" other elements will then be oriented "above" the other elements. The exemplary terms "below" or "beneath" may, therefore, encompass both an orientation of above and below.

Unless otherwise defined, all terms (including technical and scientific terms) used herein have the same meaning as commonly understood by one of ordinary skill in the art to which the present disclosure belongs. It is further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially," "generally" or "approximately" shall generally mean within 20 percent, preferably within 10 percent, and more preferably within 5 percent of a given value or range. Numerical quantities given herein are approximate, meaning that the terms "around," "about," "substantially," "generally" or "approximately" may be inferred if not expressly stated.

As used herein, the terms "comprise" or "comprising," "include" or "including," "carry" or "carrying," "has/have"

or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

Embodiments of the present disclosure are illustrated in detail hereinafter with reference to accompanying drawings. It should be understood that specific embodiments described herein are merely intended to explain the present disclosure, but not intended to limit the present disclosure.

In order to further elaborate the technical means adopted by the present disclosure and its effect, the technical scheme of the present disclosure is further illustrated in connection with the drawings and through specific mode of execution, but the present disclosure is not limited to the scope of the implementation examples.

The present disclosure relates to the field of streaming applications, and more particularly relates to a system and method for using a vertical cuckoo filter to enhance streaming applications.

FIG. 1 is a block diagram illustrating an exemplary computing system in which the present system and method may operate, in accordance with an embodiment of the present disclosure. Referring to FIG. 1, the methods and systems of the present disclosure may be implemented on one or more computers 100. The methods and systems disclosed may utilize one or more computers 100 to perform one or more functions in one or more locations. The processing of the disclosed methods and systems may also be performed by software components. The disclosed systems and methods may be described in the general context of computer-executable instructions such as program modules, being executed by one or more computers or devices. For example, the program modules include operating modules such as insert module 125, lookup module 130, delete module 135 and the like. Insert module 125 is configured to insert an element into a VCF. Lookup module is configured to query the VCF for the membership of an item. Delete module is configured to delete an item of a VCF. These program modules may be stored on mass storage device 115 of one or more computers 100 co-located with a power system or remotely located respect to a power system. Each of the operating modules may comprise elements of the programming and the data management software.

The components of the one or more computers 100 may include, for example, without limitation, one or more processors 110, mass storage device 115, operating system 120, system memory 155, Input/Output Interface 145, display adapter 140, network adaptor 150, and system bus 170 that couples the various system components. One or more computers 100 and provider 180 may be implemented over wired or wireless network 175 at physically separate locations, implementing a fully distributed system. For example, without limitation, one or more computers 100 may be a personal computer, a portable computer, a smart device, a network computer, a peer device, or other common network node, and so on. Logical connections between one or more computers 100 and one or more power systems may be made via network 175, such as a local area network (LAN) and/or a general wide area network (WAN).

The VCF of the present embodiment may be used for a wide variety of applications, especially data streaming applications. For example, without limitation, one or more computers 100 may communicate with provider 180, wherein provider 180 may transfer data elements of data streams over network 175 to one or more computers 100 to be stored on the VCF or whose membership is to be queried from the VCF. Data streaming applications may provide many new data elements over network 175 to be stored on the VCF, and many existing elements of the VCF may need to be deleted to provide space for the new data elements. Because VCF provides efficient insert and delete operations when compared to conventional membership query implementations, improved performance for data streaming applications may be realized. To insert the new data element into the VCF, insert module 125 may be configured to calculate fingerprint 165 of the new data element and one or more candidate buckets via bitmasks 160. In the preferred embodiment, VCF provides four candidate buckets per data element. Insert module 125 may then insert fingerprint 165 into one of the candidate buckets if at least one of the candidate buckets has an empty slot. Otherwise, insert module 125 may select a random slot of a random candidate bucket, insert fingerprint 165 into the random slot, and reallocate the victim element into a candidate bucket of the victim element. Insert module 125 may continue relocating victim elements until either an empty slot is found or a threshold number of iterations is reached. As each data element preferably has four candidate buckets, the number of relocations of victim elements may be minimized.

Lookup module 130 may be configured to determine the membership of a data element in the VCF. To perform the lookup operation, fingerprint 165 and candidate buckets of the data element may be determined, and the candidate buckets may be traversed to determine membership of fingerprint 165. If fingerprint 165 is found, lookup module 130 may return true; otherwise lookup module 130 may return false.

Delete module 135 may be configured to delete a fingerprint of a data element from the VCF. Similar to the lookup operation, delete module 135 may be configured to calculate fingerprint 165 and candidate buckets of the data element to be deleted, and the candidate buckets may be traversed to find the fingerprint of the data element. If found, delete module 135 may be configured to remove a copy of the fingerprint from the VCF. If not, the data element was not stored on the VCF and the delete operation may return false.

Exemplary data streaming operations from provider 180 may include, for example, without limitation, caching, media streaming, network measurement applications, network security, blacklists, whitelists, etc.

A Vertical Cuckoo filter (VCF), a new Cuckoo filter design that implements more than two candidate buckets for each item, is disclosed herein. Standard CF may achieve higher space utilization (i.e., load factor) by extending bucket size, while VCF performs better in a vertical direction, i.e., increasing the number of candidate buckets. A novel indexing scheme (vertical hashing) is described to improve the reallocation process, which determines the candidate buckets using item fingerprint and predefined bitmasks. This design benefits the VCF in two major aspects. First, the candidate buckets for an arbitrary item may be indexed with each other without additional hash computation nor access to item content. Second, VCF needs less hash computation for item insertion than the existing Cuckoo filters because CF must execute one hash computation when reallocating an evicted fingerprint. In this manner, VCF achieves higher insertion throughput by avoiding unnecessary fingerprint reallocation and hash computation.

Moreover, VCF is further improved in two aspects. First, the number of candidate buckets is generalized for each item in VCF from a fixed 4 candidate buckets to a flexible k ($\geq 4$) candidate buckets. By doing so, VCF provides a methodology to replace independent hash functions used by other methods while guaranteeing the randomness of the output. Second, two VCF variants are disclosed to realize a proper trade-off between false positive rate and load factor. Specifically, the first variant utilizes dynamic adjustments of performance by changing the bitmasks of the VCF, while the second variant changes the threshold of a fingerprint hash value to achieve a similar result.

TABLE I

COMPARISON OF DATA STRUCTURES.

| Data structure | Space | Throughput | Deletion |
| --- | --- | --- | --- |
| BF [1] | 1× | 1× | no |
| CBF [2] | 4× | <1× | yes |
| CF [5] | ≤1× | ~10× | yes |
| 4-ary CF [13] | ≤0.98× | ~3.78× | yes |
| VCF | ≤0.98× | ~20× | yes |

Empirical results are shown through a brief comparison among several related approximate membership lookup (AMQ) structures in both space utilization and insertion throughput in Table I. As shown, VCF is advantageous when compared to the other methods.

Bloom Filter and its Variants

Bloom filter. As one of the most well-known AMQ data structures, Bloom filter (BF) provides a compact representation of a set of items and supports effective membership insertion and lookup. A BF represents items with a bit array of length m, and all m bits are initially set as 0. For item insertion of $x_i$ in the set S={$x_1$, $x_2$, ..., $x_n$}, k independent hash functions {$h_1$, $h_2$, ..., $h_k$} are employed to map the item to k positions in the array. The mapped positions (i.e., $h_j(x_i)$ where j∈{1, ..., k}) in the bit array are all set to 1. To achieve a set membership lookup, the BF checks the k corresponding positions in the bit array. If all bits are 1, the lookup returns true; otherwise, the lookup returns false. BF is a space-efficient probabilistic data structure [14] with a known false positive probability $\xi$, and no false negative probability for set membership queries. Specifically, an item may be affirmed as a set member when its k hashed positions in the bit array are set as 1, due to unavoidable hash conflicts. The false positive rate is $\xi_{BF}=(1-e^{-kn/m})^k$. BF requires more space overhead to achieve lower false positives. Naturally, standard BF does not support item deletions as directly resetting the corresponding bits from 1 to 0 may cause false negative results for other items.

Counting Bloom filter. Counting Bloom filter (CBF) [2] extends the BF by adding a counter for each item of the data structure. In this way, these counters help CBF to support item deletion without affecting the existence of other items [15]. CBF also supports constant-time membership lookup.

d-left Counting Bloom filter (dlCBF). dlCBF replaces the general hash functions in CBF with a d-left hash function [16], [17]. Compared with CBF, dlCBF achieves half space-saving with the same false positive and is twice as effective in reduction of false positive rate with the same spatial scale.

Cuckoo Filter and its Variants

Cuckoo filter. Cuckoo filter (CF) is a light-weight probabilistic data structure used to support item deletions and constant-time membership queries. Structurally, a CF is a table of m buckets, each of which contains b slots. CF achieves satisfactory space efficiency for a given false positive rates [5] when b=4. Every slot stores an f-bit fingerprint $\eta_x$ of an item x, where $\eta_x = h_0(x) \mod 2^f$. Standard CF provides two candidate buckets $B_1(x)$ and $B_2(x)$ for each item x through the partial cuckoo hashing technique [18]:

$$B_1(x)=\text{hash}(x),$$

$$B_2(x)=B_1(x) \oplus \text{hash}(\eta_x) \quad (1)$$

The XOR operation ($\oplus$) in Equ. (1) ensures that the cyclic access of the two candidate buckets for an item x may be achieved by utilizing only the item's fingerprint. To insert an item x, CF is configured to compute the item's fingerprint $\eta_x$ and the indexes of the two alternate buckets $B_1(x)$ and $B_2(x)$. Thereafter, the fingerprint $\eta_x$ is stored in bucket $B_1(x)$ or $B_2(x)$ if there is an empty slot. Otherwise, if both candidates are occupied, the CF performs eviction. During eviction, the CF is configured to randomly remove a stored fingerprint of one of the candidate buckets and then insert $\eta_x$ in the slot that has just been vacated. At the same time, CF is configured to calculate another candidate bucket of the victim fingerprint and attempts to insert the victim fingerprint into that bucket. The CF recursively performs the eviction process until a candidate bucket is found with an available slot or the number of relocations performed reaches a given threshold MAX. In the process of membership lookup of set A, CF is configured to check whether the fingerprint $\eta_x$ is stored in the two candidate buckets $B_1(x)$ and $B_2(x)$. If the fingerprint is found, CF determines that x∈A, otherwise, x∉A. However, for an item y∉A, CF may find a fingerprint that is the same as f-bit fingerprint of y in one slot of candidate buckets, as potential hash collisions of fingerprints of different items may cause false positive errors. Theoretically, the false positive rate of CF is bounded as $$\xi_{CF} = 1 - \left(1 - \frac{1}{2^f}\right)^{2b} \approx \frac{b}{2^{f-1}}$$

where the size of a fingerprint is f and each bucket has b slots.

Dynamic Cuckoo filters. Dynamic Cuckoo filter [8] supports the extension of the key set by using many linked homogeneous CFs. However, each lookup needs to check all linked CFs, which causes Dynamic Cuckoo filter to have a lower lookup throughput and a higher false positive rate.

Vacuum filters. Vacuum Filters (VF) are configured to divide the whole table into multiple, equal-size chunks and ensures two candidate buckets of each item in the same chunk. VF addresses the issue that CF may only achieve its claimed advantage in memory-efficiency when the size of the table is restricted to a power of two, with a slight improvement in space utilization and lookup throughput compared with CF.

Morton filters. Morton Filter (MF) [II] is designed to provide high lookup throughput for unique hierarchical memory systems. MF introduces a compressed block format that permits the storage of a logically sparse filter compactly in memory. Besides the fingerprint storage array, each MF block contains overflow flags and bucket counters by extending extra bits. MF may be faster than CF on the ARM architecture.

D-ary Cuckoo filter. By allowing for each item to have more than two candidate buckets, D-ary Cuckoo Filter (DCF) [13] achieves efficient space utilization. DCF introduces the base-d digit-wise XOR operation that satisfies the limitation of only fingerprints available. Two keys X and Y need to be converted to their base-d form $X_d$ and $Y_d$ at first, as XOR here is defined in the base-d system. The result will be guaranteed to cycle back to X if it performs the base-d digit-wise XOR operation on Y for d times. Take d=4 (where each item has four candidate buckets) as an example. The XOR operation guarantees:

$$X_4 = X_4 \oplus Y_4 \oplus Y_4 \oplus Y_4 \oplus Y_4 \quad (2)$$

However, Dynamic Cuckoo filter performs worse than CF in false positive rate and lookup efficiency. The performance improvements made by VF are negligible. MF only supports certain lengths of fingerprints (hence specific false positive rates). DCF needs to convert each index to base-d form and then convert it back to binary form, increasing time and calculation consumption of item insertion and lookup. In insertion-intensive scenarios, both comprehensive high-speed operations and maximized space utilization are essential for a proper filter. In contrast, these CF variants suffer from severe performance degradation that significantly restricts their applications in such scenarios, as such, a Vertical Cuckoo Filter (VCF) is described herein to solve the aforementioned problems of the CF and its variants with excellent comprehensive performance and high insertion throughput.

Design of Vertical Cuckoo Filters

Vertical Hashing

Standard Vertical Hashing

To ease fingerprint reallocation and computation, the present embodiment utilizes vertical hashing to index the candidate buckets with each other. Vertical hashing is configured to divide the fingerprint's hash value into multiple fragments using bitmasks ($bm_s$). Vertical hashing implements cyclical access to multiple buckets, which may be indexed by each other by performing XOR operations on these fragments. Specifically, the process is composed of two main steps.

Figure 2:
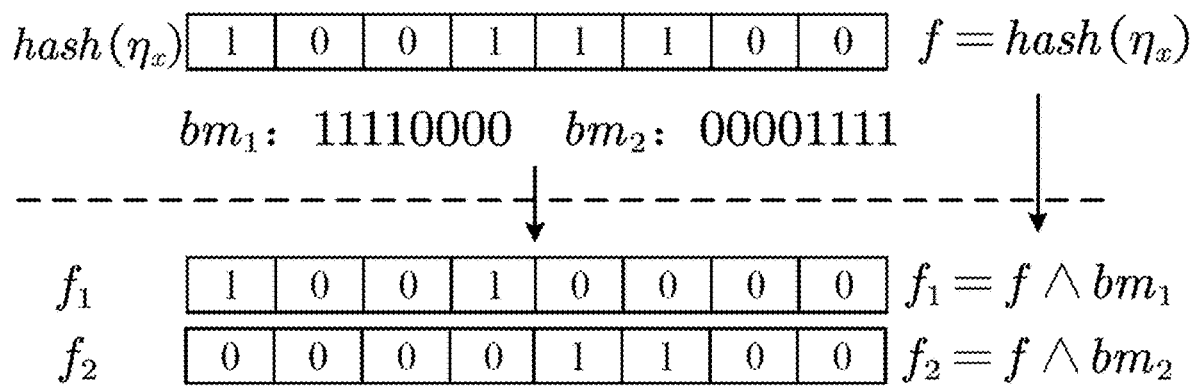
FIG. 2 illustrates an exemplary fragmentation of a fingerprint hash value, in accordance with an embodiment of the present disclosure.

In a first step, for an f-bit fingerprint of each item to insert, vertical hashing divides the fingerprint into two fragments by performing AND ($\wedge$) operations on the hash value with two bitmasks. Each AND operation with a bitmask only keeps half of the fingerprint. In FIG. 2, an 8-bit fingerprint is shown as an example (i.e., f=8) and the fingerprint's hash value of the inserted item is hash($\eta_x$)=10011100 (expressed in binary). Thereafter, the two hash value fragments $f_1$ and $f_2$ are calculated by performing AND operations between hash($\eta_x$) and $bm_1$ and $bm_2$, respectively. Thereby, the first fragment $f_1$ may be calculated as $f_1$=hash($\eta_x$) $\wedge$ $bm_1$=10010000.

An illustrative example of the fragmentation of the fingerprint's hash value.

In a second step, based on the two fragments of 17x, four candidate buckets are determined that may be directly indexed by each other. In detail:

$B_1(x)$=hash(x), $B_2(x)=B_1(x) \oplus f_1 = B_1(x) \oplus$hash($\eta_x$)$\wedge bm_1$, $B_3(x)=B_1(x) \oplus f_2 = B_1(x) \oplus$hash($\eta_x$)$\wedge bm_2$, $B_4(x)=B_1(x) \oplus f = B_1(x) \oplus$hash($\eta_x$) \quad (3)

Theorem 1. Only when the first bitmask is an inverse of the second bitmask (i.e., $bm_1 = \neg bm_2$), vertical hashing may circularly access all four candidate buckets for any item via its current location, fingerprint and bitmasks, without additional hash computation nor accessing the content of the present candidate bucket $B_i$.

To displace an item x originally in a bucket $B_i$, vertical hashing directly calculates alternate buckets $B_m$, $B_n$ and $B_j$ from the current bucket index BL and the fingerprint $\eta_x$ stored in this bucket by:

$B_m = B_i \oplus$hash(?$\eta_x$)$\wedge bm_1$, $B_n = B_i \oplus$hash($\eta_x$)$\wedge bm_2$, $B_j = B_i \oplus$hash($\eta_x$) \quad (4)

When $bm_1 = \neg bm_2$, substituting $B_i$ of Equ. (4) with $B_2(x)$ in Equ. (3), $B_m = B_1(x)$, $B_n = B_4(x)$ and $B_j = B_3$ (x). Let $B_j = B_3$ (x). Let $B_i = B_1(x)$, $B_i = B_3$ (x) or $B_i = B_4(x)$, achieving the same results.

A special case is also considered, wherein hash($\eta_x$) is shaped like ** 0000 or 0000 ** (*=1 or 0) in the example shown in FIG. 2. The special case results in only two candidate buckets since $B_i$, $B_j = B_m$ or $B_n$. Assuming that the fingerprint size of VCF is f, the probability of obtaining different alternate buckets successfully is as follows:

$$P = 1 + 2^{-f} - 2^{1-\frac{f}{2}} \quad (5)$$

The probability that an item has only two candidate buckets is small. Precisely, in the present embodiment, only one-eighth of the insertions in FIG. 2 have two candidate buckets. With the increase of fingerprint length, the ratio will decrease rapidly. Additionally, failing to extend the number of buckets does not affect the insertion, deletion, or query of VCF.

Generalized Vertical Hashing

Basic vertical hashing may be extended by increasing the number of bitmasks from two bitmasks to k−2 (k>4) bitmasks. Suppose that there are k−2 random different bitmasks with the same size as the hash value of fingerprints, then all of the k candidate buckets for a given item x may be derived as follows:

$B_1(x)$=hash(x), $B_2(x)=B_1(x) \oplus$hash($\eta_x$)$\wedge bm_1$, $B_3(x)=B_1(x) \oplus$hash($\eta_x$)$\wedge bm_2$, $B_{k-1}(x)=B_1(x) \oplus$hash($\eta_x$)$\wedge bm_{k-2}$, $B_k(x)=B_1(x) \oplus f = B_1(x) \oplus$hash($\eta_x$) \quad (6)

Theorem 2. According to Equ. 6, for an item x, its any candidate bucket $B_e(x)$ (1<e<k) may be derived out through any other candidate bucket $B_g(x)$ (1<g<k) with the following equation:

$B_e(x)=B_g(x) \oplus$hash($\eta_x$)$\wedge bm_g \oplus$hash($\eta_x$)$\wedge bm_e$ \quad (7)

Since $B_g(x)=B_1(x) \oplus$hash($\eta_x$)$\wedge bm_g$, $B_g(x) \oplus$hash($\eta_x$)$\wedge bm_g = B_1(x)$. Substituting this equation into Equ. (7), it is evident that $B_e(x)=B_1(x) \oplus$hash($\eta_x$)$\wedge bm_e$. Thus, generalized vertical hashing may also circularly access all k−1 candidate buckets of $B_e(x)$ with $bm_e$ as prior knowledge.

The Vertical Cuckoo Filters

Compared to partial cuckoo hashing, vertical hashing provides more candidate buckets for a given item, so each item has a greater probability of finding an empty slot during the insertion process, reducing the hash computation of fingerprint reallocations. Moreover, vertical hashing is far more concise in calculation than base-d digit-wise XOR operation in DCF. Therefore, using vertical hashing may help VCF obtain higher space utilization and insertion throughput than CF and faster insertion, lookup, and deletion than DCF.

Like CF, VCF also uses slots as the basic unit of the cuckoo hash tables, and each slot stores only one fingerprint. Several such slots constitute a bucket, and these ranked buckets construct a hash table for VCF. By using vertical hashing, VCF may generally index four candidate buckets with the fingerprint and bitmasks. However, VCF may only get two candidate buckets as the insertion of item y shown in FIGS. 3A-3B.

| | Algorithm 1: Insert (x) in VCF |
|---|---|
| 1 | define $bm_1$ and $bm_2$; |
| 2 | f=fingerprint(x); |
| 3 | $i_1$ = hash(x); |
| 4 | $i_2 = i_1 \oplus $ hash(f) $\wedge bm_1$; |
| 5 | $i_3 = i_1 \oplus $ hash(f) $\wedge bm_2$; |
| 6 | $i_4 = i_1 \oplus $ hash(f); |
| 7 | if Bucket[$i_1$] or Bucket[$i_2$] or Bucket[$i_3$] or Bucket[$i_4$] has an empty slot then |
| 8 |     add f to that bucket; |
| 9 |     return Done; |
| 10 | // must relocate existing items; |
| 11 | $B_i$ = randomly pick $i_1, i_2, i_3$ or $i_4$: |
| 12 | for s=0; s<MaxNumKicks; s + + do |
| 13 |     randomly select la slot e from Bucket[$B_i$]; |
| 14 |     swap f and the fingerprint stored in slot e: |
| 15 |     $B_m = B_i \oplus $ hash(f) $\wedge bm_1$; |
| 16 |     $B_n = B_i \oplus $ hash(f) $\wedge bm_2$; |
| 17 |     $B_j = B_i \oplus $ hash(f); |
| 18 |     if Bucket [z] (z = $B_m, B_n,$ or $B_j$) has an empty slot then |
| 19 |       add f to Bucket [z]; |
| 20 |       return Done; |
| 21 |     $B_i$ = randomly pick $B_m, B_n$ or $B_j$; |
| 22 | // Hashtable is considered full; |
| 23 | return Failure |

Figures 3A, 3B:
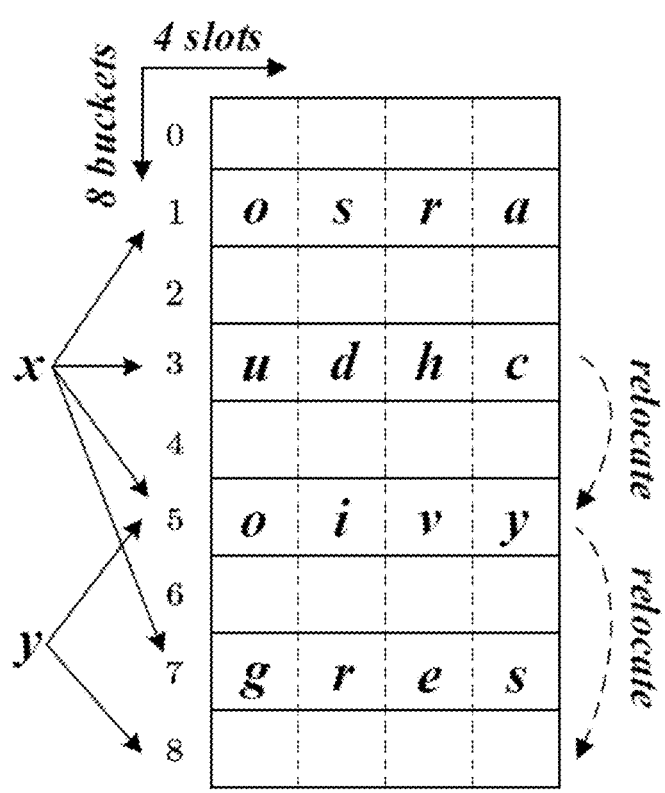

Insertion. The insertion of VCF is shown in FIG. 3A-3B. Suppose x is the item to be inserted, and the sequence numbers of its four candidate buckets are 1, 3, 5, and 7, as shown in FIG. 3A. If any of these four candidate buckets have an empty slot, x may be stored in the empty slot. Otherwise, if all candidate buckets (1, 3, 5, and 7) are occupied, VCF will randomly choose one of the candidate buckets, say bucket 3, and evict an item randomly from the selected candidate bucket, e.g., item c. The evicted item may be reinserted into alternate buckets of the evicted item. In this example, the victim c will trigger another relocation of item y in bucket 8. Then y will be reallocated to its alternative candidate bucket, i.e., bucket 5. This allocation procedure continues until an empty slot is available or the times of such reallocations reach the predefined threshold. The final storage state is shown in FIG. 3B. Once the eviction iterations reach the threshold (i.e., MaxNumKicks), the VCF is considered too full to insert more items. Thus, the VCF insertion returns an insertion failure. The details are shown in Algorithm 1.

| | Algorithm 2: Lookup (x) in VCF |
|---|---|
| 1 | f=fingerprint(x); |
| 2 | $i_1$ = hash(x); |
| 3 | $i_2 = i_1 \oplus $ hash(f) $\wedge bm_1$; |
| 4 | $i_3 = i_1 \oplus $ hash(f) $\wedge bm_2$; |
| 5 | $i_4 = i_1 \oplus $ hash(f); |
| 6 | if Bucket[$i_1$] or Bucket[$i_2$] or Bucket[$i_3$] or Bucket[$i_4$] has f then |
| 7 |     return True; |
| 8 | return False |

Lookup. Item lookup of the VCF is shown in Algorithm 2. For a given item x, the algorithm first calculates its fingerprint and four candidate buckets according to Equ. (3). When any existing fingerprint in these bucket matches, the VCF returns true; otherwise, false is returned. VCF has no false negatives, just like CF. Notice that if VCF fails to provide four candidate buckets, only two buckets are involved in the lookup process.

| | Algorithm 3: Delete (x) in VCF |
|---|---|
| 1 | f=fingerprint(x); |
| 2 | $i_1$ = hash(x); |
| 3 | $i_2 = i_1 \oplus $ hash(f) $\wedge bm_1$; |
| 4 | $i_3 = i_1 \oplus $ hash(f) $\wedge bm_2$; |
| 5 | $i_4 = i_1 \oplus $ hash(f); |
| 6 | if Bucket[$i_1$] or Bucket[$i_2$] or Bucket [$i_3$] or Bucket [$i_4$] has f then |
| 7 |     remove a copy of f from that bucket: |
| 8 |     return True; |
| 9 | return False |

Deletion. The deletion process of the VCF is detailed in algorithm 3. Similar to the lookup process, VCF checks all four candidate buckets for the given item first. If any matched fingerprint is found, one copy of that fingerprint will be removed from the bucket. Similar to CF, VCF also overcomes the mis-deletion problem. To be specific, even if several items have the same candidate buckets and also have the same fingerprint in one of these shared buckets, VCF may delete all or part of these items safely as long as they have been previously inserted.

Generalization of Vertical Cuckoo Filters

VCF may be generalized to k-VCF that has k (k>4) candidate buckets for each given item, using the generalized vertical hashing and additional mark bits. k-VCF may also circularly access all of the k candidate buckets.

Figure 4A:
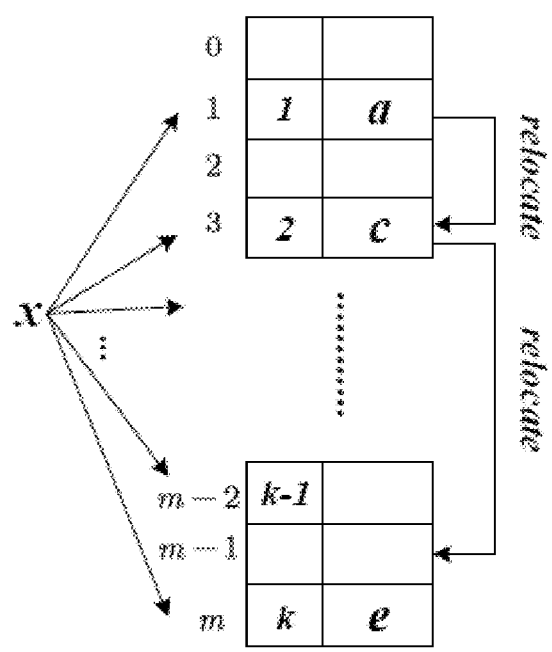
Figure 4B:
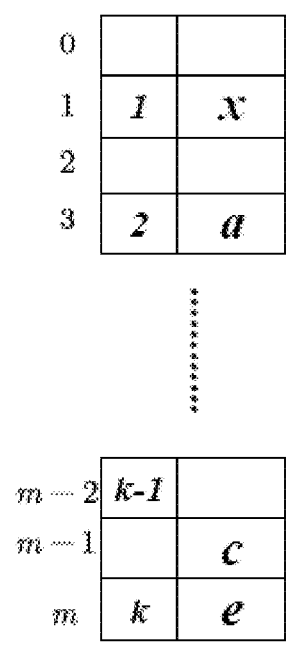

However, k-VCF does not satisfy Theorem 1 like VCF, so it must add mark bits to label the bitmasks, i.e., $e^{th}$ of $bm_e$ in Equ. (7) for each slot. Consequently, each slot must have two fields, the fingerprint field and the counter field. For example, k-VCF needs to add extra three bits as a counter field based on a fingerprint when k=7. As shown in FIGS. 4A-4B, for example, without limitation, to insert an item x into the k-VCF where all of the candidate buckets are full, the item eviction process is triggered. Then k-VCF will randomly choose a victim bucket, such as bucket 1 in FIG. 4A, as well as a random slot in that bucket. After accessing both the fingerprint field and the counter field of bucket 1, k-VCF will compute another candidate bucket by Equ. (7), such as bucket 3 in FIG. 4A. This insertion procedure will end until a bucket with an empty slot is found, such as bucket m−1 in FIG. 4A or the times of such displacements reach the predefined threshold.

Most current sketch data structures, such as Count-Min Sketch [19], Adaptive Sketch [20], and Level Hashing [21], have to execute two or more hash calculations to index the corresponding blocks. By contrast, k-VCF only requires one hash computation, i.e., to derive out the item fingerprint. Therefore, k-VCF may provide a much faster lookup in most cases. Additionally, most concurrent cuckoo hash tables fail to efficiently address the problem of endless loops during item insertion due to the potential hash collisions [22]. However, as the number of candidate buckets increases, the probability of such endless loop formation in both VCF and k-VCF may be significantly reduced.

Variants of Vertical Cuckoo Filters

VCF improves the load factor by increasing the candidate buckets while also causes an increase in false positives. Although the easiest way to reduce the false positive rate is to reduce the number of slots of buckets in VCF, this will result in a significant compromise in space utilization. Extensive experiments have proved that VCF using buckets of size four cannot improve CF with buckets of size two or three with the same table size. Therefore, reducing the number of slots in candidate buckets of VCF may not be desirable.

To this end, all VCFs and variants disclosed herein may maintain four slots per candidate bucket. Two innovative methods are disclosed (i.e., Inversed Vertical Cuckoo Filters (IVCF) and Differentiated Vertical Cuckoo Filters (DVCF)) to make a proper trade-off between load factor and false positive rate. As k-VCF is different from VCF and CF structurally, IVCF and DVCF are not applied to k-VCF.

The Inversed Vertical Cuckoo Filters

IVCF changes the bitmask forms in VCF and realizes the trade-off among false positive rate, load factor, and throughput of insertion, lookup, and deletion. As long as the two bitmasks satisfy $bm_1 = \neg bm_2$, such as 0101010 and 1010101, they may be implemented in VCF. When all bits in $bm_1$ are 0 or 1, VCF will be degraded as CF and only provide two candidate buckets, as described above.

Assume that VCF use f-bits fingerprints, and there are l (0<l<f) 0s and f−l 1s in $bm_1$. The probability P that VCF will provide 4 candidate buckets may be formulated as follows.

$$P = 1 - \frac{2^l + 2^{f-l} - 1}{2^f} \approx 1 - 2^{l-f} - 2^{-l} \quad (8)$$

where l is the number of 0s in $bm_1$.

From the above equation, as long as the value of |2l−f| decreases while f remains unchanged, the value of P will increase. A larger f will also cause a higher P with the same |2l−f|. For example, when f=8, the probability P will approximate to ⅞ when l=4, while P decreases rapidly to ½ when l=7. In addition, suppose that VCF increases the length of fingerprint to 16 bits and 2l−f remains 0, i.e. f=16 and l=8, then P≈0.9922. With such a probability, VCF may provide four candidate buckets for most items.

The failure to provide four candidate buckets may lower the overall load factor for item insertion and lower the false positive rate for membership testing. In other words, a larger P value results in a higher load factor and also a higher false positive rate, and vice versa. Therefore, a proper trade-off between load factor and false positive rate may be implemented by altering the P value by adjusting the bitmasks. The method is named Inversed Vertical Cuckoo Filters, meaning to convert VCF to CF through a lower P value. As the length of fingerprint f is unchanged in IVCF, only the number of 0-bits in $bm_1$ may be changed (i.e., l) to achieve the performance trade-off. However, IVCF cannot arbitrarily look for trade-offs because IVCF may only set the bitmasks into a few fixed forms, causing P to be discrete, such as P≈{0, 0.49, 0.73, 0.84, 0.87} when f=8.

It is proven that different bitmask forms will lead to an unequal probability of scaling the number of candidate buckets. IVCF takes advantage of this property to achieve a flexible trade-off. The failure to increase the number of buckets does not affect the insertion, lookup, and deletion operations. Consequently, Algorithm 1, Algorithm 2 and Algorithm 3 described above are also appropriate for IVCF.

The Differentiated Vertical Cuckoo Filters

In response to the failure of IVCF to arbitrarily seek trade-offs, DVCF is disclosed, which uses the same bitmasks as standard VCF. At first, DVCF divides the value range of hash($\eta_x$) in Equ. (3) into two parts by setting a threshold $\Delta t$. The first interval $In_1$ is [T/2−$\Delta t$, T/2+$\Delta t$], and the second interval $In_2$ is [0, T/2−$\Delta t$]∪[T/2+$\Delta t$, T]. Thereafter, DVCF differentiates the fingerprints that lie in these two intervals and provides different number of candidate buckets to them.

| | Algorithm 4: Inset (x) in DVCF |
|---|---|
| 1 | define $bm_1$, $bm_2$, and the threshold $\Delta t$; |
| 2 | f=fingerprint(x); |
| 3 | if f ∈ [T − $\Delta t$, T + $\Delta t$] then |
| 4 |    $i_1$ = hash(x), $i_2 = i_1 \oplus$ hash(f) $\wedge$ $bm_1$, $i_3 = i_1 \oplus$ hash(f) $\wedge$ $bm_2$, $i_4 = i_1 \oplus$ hash(f); |
| 5 |    if Bucket[i](i = $i_{1,2,3\ or\ 4}$) has an empty slot then |
| 6 |       add f to that bucket; |
| 7 |       return Done; |
| 8 | else |
| 9 |    $i_1$ = hash(x), $i_2 = i_1 \oplus$ hash(f); |
| 10 |    if Bucket[$i_1$] or Bucket[$i_2$] has an empty slot then |
| 11 |       add f to that bucket; |
| 12 |       return Done; |
| 13 | $B_i$ = randomly pick one from any Bucket[i]; |
| 14 | for s=0; s<MaxNumKicks; s + + do |
| 15 |    randomly select a slot e from Bucket[$B_i$]; |
| 16 |    swap f and the fingerprint stored in slot e; |
| 17 |    if f ∈ [T − $\Delta t$, T + $\Delta t$] then |
| 18 |       $B_m = B_i \oplus$ hash(f) $\wedge$ $bm_1$, $B_n = B_i \oplus$ hash(f) $\wedge$ $bm_2$, $B_j = B_i \oplus$ hash(f); |
| 19 |       if Bucket[z] (z = $B_m$, $B_n$ or $B_j$) has an empty slot then |
| 20 |          add f to Bucket [z]; |
| 21 |          return Done; |
| 22 |       $B_i$ = randomly pick $B_m$, $B_n$ or $B_j$; |
| 23 |    else |
| 24 |       $B_j = B_i \oplus$ hash(f); |
| 25 |       if Bucket[$B_j$] has an empty slot then |
| 26 |          add f to Bucket[$B_j$]; |
| 27 |          return Done; |
| 28 |       $B_i = B_j$; |
| 29 | return Failure |

As shown in Algorithm 4, to insert an item x, DVCF will first calculate the fingerprint and then determine which interval this fingerprint belongs to. If it belongs to the first interval, i.e., $In_1$, then DVCF will obtain its four candidate buckets by Equ. (3); otherwise, DVCF will derive out two candidate buckets by Equ. (1). During each relocation, the judgment about the victim's location is necessary before reinserting this victim.

The insertion method in Algorithm 4 provides four candidate buckets for all the coming items which belong to $In_1$ since $B_i$, $B_j = B_m$ or $B_n$ in Equ. (4) is not satisfied. In other words, DVCF is the combination of VCF and CF by implementing the intervals. Therefore, assume DVCF uses f-bit fingerprints, the proportion p of items with four candidate buckets may be calculated as follows.

$$p = \frac{2\Delta t}{T} = \frac{2\Delta t}{2^f} \quad (9)$$

Algorithm 5: Lookup (x) in DVCF

```
1    f=fingerprint(x);
2    if f ∈ [T − Δt, T + Δt] then
3    |    i₁ = hash(x);
4    |    i₂ = i₁ ⊕ hash(f) ∧ bm₁;
5    |    i₃ = i₁ ⊕ hash(f) ∧ bm₂;
6    |    i₄ = i₁ ⊕ hash(f);
7    |    if Bucket[i₁] or Bucket[i₂] or Bucket[i₃] or Bucket[i₄]
     |    has f then
8    |    |    return True;
     └
9    else
10   |    i₁ = hash(x);
11   |    i₂ = i₁ ⊕ hash(f);
12   |    if Bucket[i₁] or Bucket[i₂] has f then
13   |    |    return True;
     └
14   return False
```

Algorithm 6: Delete (x) in DVCF

```
1    f=fingerprint(x);
2    if f ∈ [T − Δt, T + Δt] then
3    |    i₁ = hash(x);
4    |    i₂ = i₁ ⊕ hash(f) ∧ bm₁;
5    |    i₃ = i₁ ⊕ hash(f) ∧ bm₂;
6    |    i₄ = i₁ ⊕ hash(f);
7    |    if Bucket[i₁] or Bucket[i₂] or Bucket[i₃] or Bucket[i₄]
     |    has f then
8    |    |    remove a copy of f from that Bucket;
9    |    |    return True;
     └
10   else
11   |    i₁ = hash(x);
12   |    i₂ = i₁ ⊕ hash(f);
13   |    if Bucket[i₁] or Bucket[i₂] has f then
14   |    |    remove a copy of f from that bucket;
15   |    |    return True;
     └
16   return False
```

Indeed, the p value in Equ. (9) is the same as the P value in Equ. (8). The lookup and deletion operations of DVCF are also similar to VCF, but with one more step of judgment, as shown in Algorithm 5 and Algorithm 6 respectively. In conclusion, DVCF achieves the trade-off between load factor and false positive by adjusting the threshold, i.e., $\Delta t$, at the cost of one more step of judgment.

Performance Analysis

The analysis results on VCF in terms of the load factor, false positive rate, space and time cost is described below. The notations used for analysis are shown in Table II.

TABLE II

THE NOTATIONS USED FOR OUR IANALYSIS

| Notation | Explanatory |
|---|---|
| f | the length of fingerprint in bits |
| $\alpha$ | the load factor ($0 \leq \alpha \leq 1$) |
| b | the number of slots per bucket |
| m | the number of buckets |
| n | the size of filter |
| d | the number of candidate buckets |
| $\xi$ | the false positive rate |
| r | the probability of providing 4 candidate buckets |
| C | the average bits per item |
| $\beta$ | the rate of increase in load factor |

Load Factor

Figure 5:
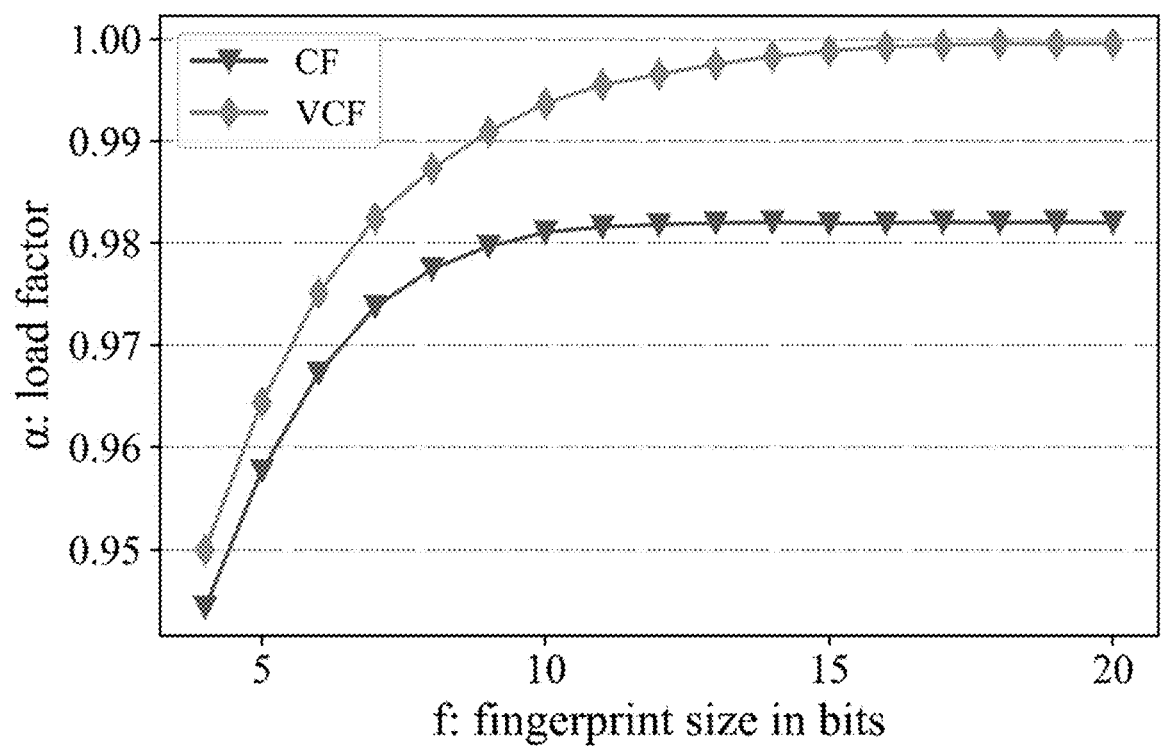
FIG. 5 illustrates an exemplary graph depicting a load factor achieved using different fingerprint lengths, in accordance with an embodiment of the present disclosure.

The load factor (i.e., the ratio between the number of stored fingerprints and the filter's capacity) is described as $\alpha = n/bm$. In reality, there is no theoretical result of a that fits the four-slot table design [10]. Therefore, experiments were conducted to test the maximum load factor for the standard CF and VCF with the same parameter settings. The experiments show that a VCF with one million items may realize around 98% loads when each bucket holds four fingerprints with 7 bits. VCF may achieve almost 100% of the load factor when f=18, as shown in FIG. 5 (where VCF and CF have $2^{20}$ slots). If the hash table stores relatively short fingerprints, the chance of insertion failures will increase due to hash collisions, reducing the table occupancy ratio. Hence a larger f leads to a higher load factor.

False Positive Rate and Space Cost

In the present embodiment, the false positive rate of VCF depends on three factors: 1) the length of fingerprint f; 2) the probability of successfully providing four candidate buckets, denoted as r (r=P or p, given in Equ. (8) and Equ. (9), respectively); and 3) the number of slots b in each bucket (usually set to 4).

When looking up a non-existent item x in a slot, the probability of mismatch (i.e., false positive error), is at most $1/2^f$. The lookup algorithm must probe all slots in its candidate buckets, and the number of these slots is related to both $\alpha$ and d. The expected number of fingerprint comparisons is $(2r+2)b\alpha$. Therefore, the upper bound of the total probability of false positive rate may be calculated as:

$$\xi = 1 - \left(1 - \frac{1}{2^f}\right)^{(2r+2)b\alpha} \approx \frac{2(r+1)b\alpha}{2^f} \quad (10)$$

In Equ. (8), $\xi$ is proportional to the average bucket size $2(r+1)b$. $\beta = (\alpha - \alpha')/\alpha'$ represents the growth rate of load factor, where $\alpha'$ is the load factor of CF. The false positive rate of VCF increases $(\beta+1)(r+1)$-fold compared to CF (where r=0). Furthermore, the minimal fingerprint size for a given target false positive $\xi$ is:

$$f \geq \lceil \log_2(2(r+1)b\alpha/\xi) \rceil \quad (11)$$

Similar to $\xi$, f depends on the average bucket size $2(r+1)b$. For a given set of items, the average space cost C is:

$$C = \lceil \log_2(2(r+1)b\alpha/f) \rceil / \alpha \quad (12)$$

Unlike the standard CF, VCF may not only improve $\alpha$ by increasing b but also adjust $\alpha$ and $\xi$ by dynamically changing the value of r. Because VCF improves the load factor such that it may store more items with the same filter size compared to standard CF, VCF is more space-saving than CF. For example, when setting b=4 and f=10, the $\alpha$ of CF is 0.95. So the bits per item for CF is $3.08 + 1.05 \log_2(1/\xi_0)$, where $\xi_0$ is the false positive rate of CF. Given r=1/2, the load factor for VCF is $\alpha = 98\%$. Therefore, the bits per item for VCF is $2.98 + 1.02 \log_2(1/\xi_0)$, which is smaller than CF.

Time Cost

The time cost for each lookup or deletion is constant in both CF and VCF, as either of them only needs about $2(r+1)$ memory accesses. However, the value of r in CF is 0, which means VCF needs more time to look up or delete with additional 2r memory accesses.

Wang et al. [10] use the average traversed number of buckets to reflect the time cost for each insertion of CF indirectly. Notice that the searching process follows the Bernoulli distribution with a successful rate $1 - \alpha^{(2r+1)b}$ in the insertion algorithm. Therefore, the probability that all the $(2r+1)b$ slots in the candidate buckets for an evicted fingerprint are full is $\alpha^{(2r+1)b}$. The reason is that all fingerprints are uniformly distributed among the buckets. Let $\pi$ be the number of evicted fingerprints, and $E(\pi_\alpha)$ be the expectation of $\pi$ under the load factor $\alpha$, then $E(\pi_\alpha)$ may be estimated by:

$$E(\pi_\alpha)=(1-\alpha^{(2r+1)b})+\alpha^{(2r+1)b}(E(\pi_\alpha)+1) \quad (13)$$

With $E(\pi_\alpha)=1/(1-\alpha^{(2r+1)b})$ the average insertion cost E for serial insertions from load factor 0 to $\alpha$ may be derived from the following formula:

$$E = \int_0^\alpha E(\pi_x)dx = \int_0^\alpha 1/(1-x^{(2r+1)b})dx \quad (14)$$

In order to better analyze the experimental results, Equ. (14) is improved as Equ. (15), where $\lambda$ means the number of slots in the filter, while $\lambda_0$ demotes the number of inserted items when the filter reaches the theoretical maximum space utilization. For example, let r=0, b=4, $\alpha$=0.95 and $\lambda_0/\lambda$=0.98, then $E_0$=11.3, which means the standard CF needs to kick out almost 11.3 fingerprints for each inserted item in our experiments. While with r≈1, b=4, $\alpha$=0.995 and $\lambda_0/\lambda$≈1, $E_0$=1.22 for VCF. The experimental results show that the VCF may significantly reduce the number of eviction operations to effectively decrease the time cost for insertion compared to the standard CF.

$$E_0 = \frac{\lambda_0}{\lambda}E + 500\left(1 - \frac{\lambda_0}{\lambda}\right) \quad (15)$$

As disclosed above, the endless loops during item insertion will drastically impact space utilization and waste time. Due to the potential endless loops in insertion, the filter suffers from its performance reliability problems. However, VCF dramatically reduces the probability of endless loops as the number of candidate buckets increases. In this way, VCF may significantly improve space utilization, save time cost, and make the insertion performance more robust.

Evaluation

As described below, the performance of IVCF, DVCF is compared with the standard CF and DCF. To demonstrate the effectiveness and efficiency of VCF, the present disclosure tests all filters on a real-world dataset. The experimental settings are determined and the results of extensive simulations from several orthogonal metrics are presented: load factor, time consumption, false positives, and the impact of parameters, i.e., the number of candidate buckets k and the type of hash functions. The code for Vertical Cuckoo Filter is opensource.

Experimental Settings

Datasets. Higgs, a real-world dataset, is used as the input of the filters. There are in total 28 kinematic features obtained through particle detectors. The third and fourth features are merged and data pre-processing is preformed through de-duplication to build the dataset used in the experiments disclosed herein.

Metrics. For item insertion, load factor and time-consumption are used to test insertion throughput. Insertion time consumption is also indirectly tested through the average number of fingerprint evictions. For item query, the lookup throughput is compared via the average response time. After querying all items that have never been stored, the ratio between the number of TRUE returned by the filters and this dataset's size is recorded as their false positive rate. Several comprehensive experiments are designed to explore the impact of the parameter k in k-VCFs. Furthermore, the filters were evaluated with diverse hash functions to quantify their impacts.

Experiment setup. For all experiments, let MAX=500 and f=14. The value of r is varied from a small value to nearly 1 in IVCFs and DVCFs. The hash function used herein is, for example, without limitation, (Fowler-Noll-Vo) FNV hash. All experiments are conducted in a machine with an Intel Core i7 processor and 16 GB DRAM. Each experiment is conducted one thousand times and the average value is reported. To understand how the IVCF and DVCF achieve the trade-off between different performances, seven IVCFs and eight DVCFs are utilized with different values of r. Specifically, let $IVCF_i$ represent the IVCF that contains i 1s in its first bitmask, and $DVCF_j$ denote the DVCF that satisfies $2\Delta t = j \times 0.125 \times 2^{14}$, where i and j are positive integers. Note that r may be derived from Equ. (8) and Equ. (9).

Baselines. To better illustrate the advancements of vertical hashing, experiments were conducted on CF, DCF, and the variants of VCF simultaneously with the same experimental settings. As baselines, CF may be regarded as a kind of IVCFs or DVCFs when r=0. The d in DCF is fixed as 4.

Numerical Results

Disclosed below, numerical results of filters, for item insertion (load factor and time consumption), lookup (average response time and false positive rate), and more (different k in k-VCFs and hash functions) are shown in Table III. These results verify that all performance metrics of VCF are related to r, yielding a trade-off among space, speed and accuracy.

TABLE III

THE NUMERICAL RESULTS OF LF (LOAD FACTOR), IT (AVERAGE INSERT TIME), QT (QUERY TIME FOR MIXED ITEM) AND FPR (FALSE POSITIVE RATE).

|  | LF (%) | IT(us) | QT(us) | FPR(×10⁻³) |
| --- | --- | --- | --- | --- |
| CF | 98.16 | 15.86 | 18.10 | 0.485 |
| DCF | 99.94 | 32.80 | 53.77 | 0.967 |
| VCF1-VCF | 99.64-99.95 | 13.40-8.95 | 19.42-19.62 | 0.739-0.974 |
| DVCF1-8 | 98.90-99.85 | 14.72-10.21 | 18.20-19.88 | 0.547-0.974 |

Load Factor

Figure 6A:
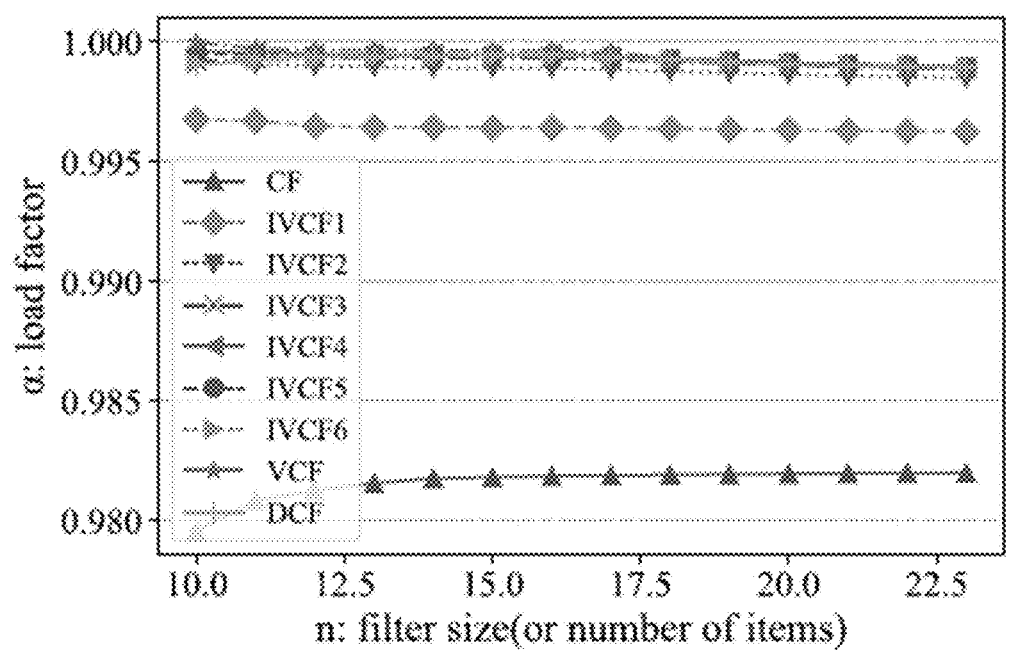
Figure 6B:
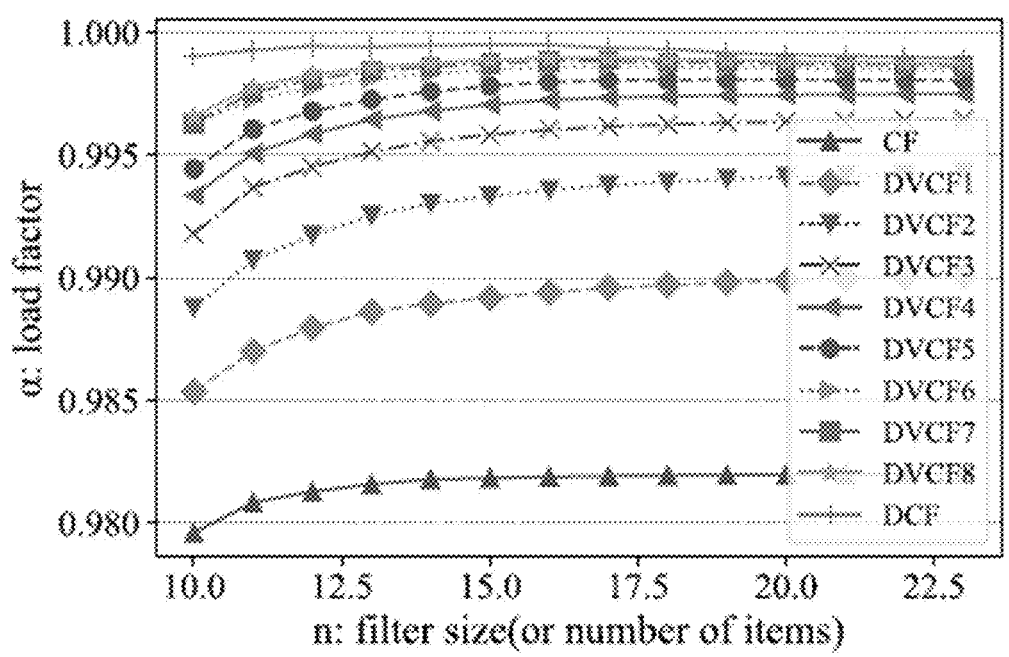
Figure 6C:
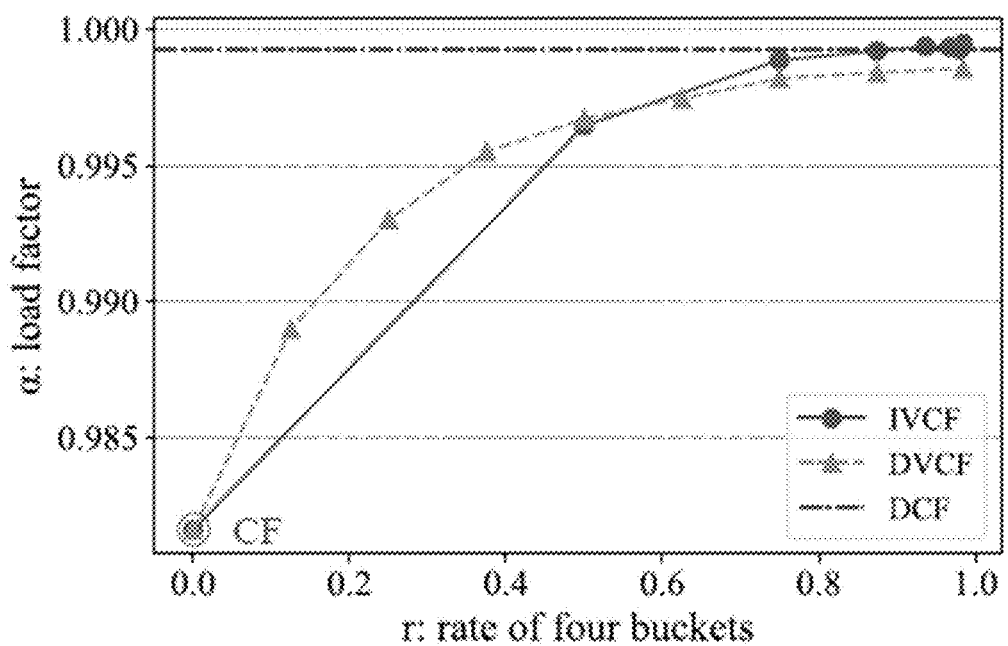

The load factor $\alpha$ for IVCF and DVCF is evaluated with the same filter size n (assume that $n=2^\theta$, and the parameter $\theta$ is varied from 10 to 23). In the experiments, n items were randomly selected from the real-world dataset and fed to an empty filter with n slots. A small portion of items fail to be stored as the number of eviction fingerprints reached the predefined threshold. The total average value of $\alpha$ under different filter sizes is calculated to compare the performance of VCFs using two different trade-off methods. FIGS. 6A-6C shows the load factor achieved as two parameters are varied: 1) the probability of providing 4 candidate buckets, (i.e., r); 2) the filter size n.

FIGS. 6A-6C records the improvement of load factor $\alpha$ with increment of r. When r=0.9844, the table occupancy ratio of CF is only 98.2%, while the load factors of IVCF and DVCF may reach near 100% and 99.85%, respectively. Compared with CF, $IVCF_i$ (i=1, 2, ..., 6) in FIG. 6A and $DVCF_i$ (i=1, 2, ..., 8) in FIG. 6B improve space utilization significantly. Furthermore, the load factor of DVCF degrades when the filter size decreases, while IVCF has no such problem. All load factor values of a filter are calculated with different r values. As shown in FIG. 6C, the $\alpha$ of IVCF and DVCF increase consistently when r grows. With the same r, the load factor of IVCF is slightly higher than that of DVCF. The experiment result of IVCF is a set of discrete points because IVCF cannot continuously adjust two bitmasks. Since r has no impact on DCF, DCF has a constant load factor as VCF.

Time Consumption

Figure 7A:
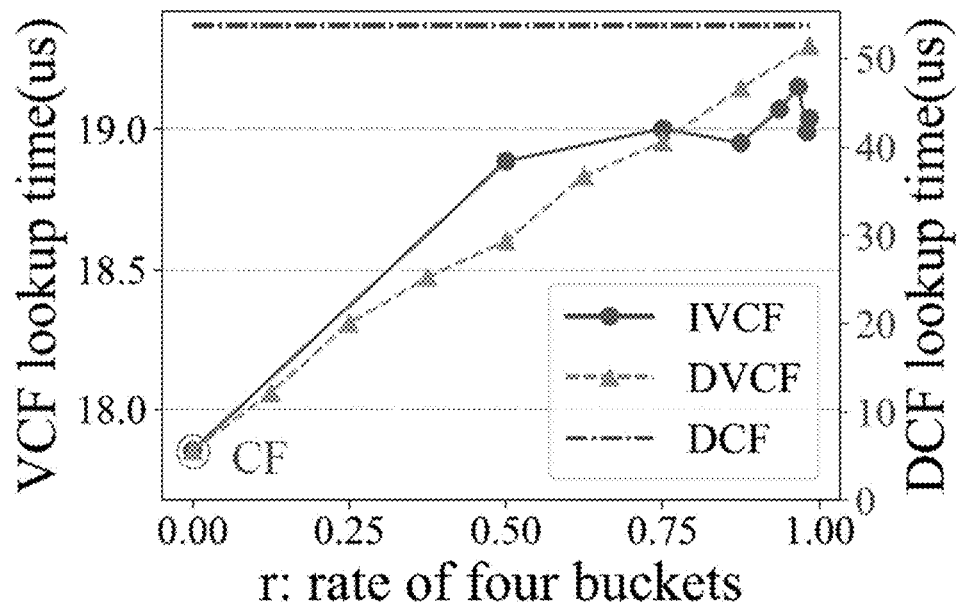
Figure 7B:
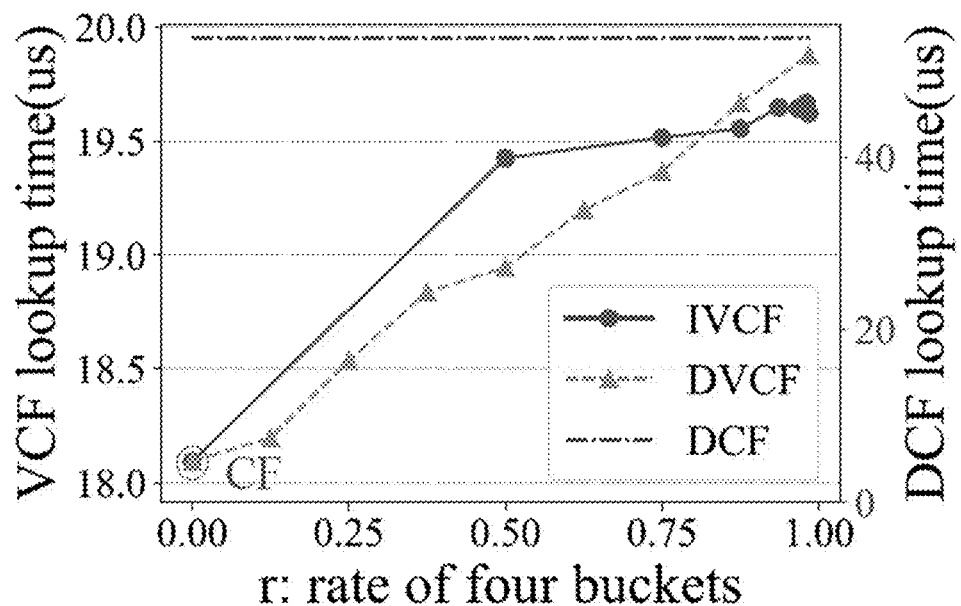

Lookup time consumption. In the lookup experiments, the number of slots in filters and dataset size are fixed as $2^{20}$. FIGS. 7A-7B shows the average time consumption for each lookup in the following two cases: 1) 100% of existing items; and 2) 50%-50% mix of existing and alien items. Results show that the lookup time overhead of IVCFs is constant 0.06× and 0.08× more than the standard CF for positive and mixed lookups, respectively. The reason is that, for any given item, no matter whether the number of its candidate buckets increases successfully or fails, its lookup needs to operate on all four buckets (which may be duplicates).

The average number of eviction for item insertion of IVCFs and DVCFs when the filter size is fixed as $2^{20}$.

The lookup time of DVCFs has a significant positive relationship with the value of r, which ranges from 0.125 to 0.9844. In general, the lookup performance of both IVCF and DVCF is slightly inferior to CF, and a major inefficiency is resulted from the number of candidate buckets. IVCF outperforms DVCF when r>0.8 because DVCF needs an additional judgment before each lookup. Furthermore, comparing FIG. 7A and FIG. 7B, negative lookups consume more time as they need to access more candidate buckets. All VCFs perform better than DCF in lookup since indexing the candidate buckets in DCF is more complicated.

Insertion time consumption. To better analyze the results in FIGS. 8A-8C, $E_0$ is used to represent the average times of evicted operations. FIG. 9 shows that $E_0$ of VCFs drops sharply as r increases. This phenomenon means that the VCF algorithm may significantly reduce the kick-out and reinsertion operations when r grows. For example, $E_0$ of VCF is about 1.27 while this value of CF achieves 12.8, and these values are close to analysis results described above. The $E_0$ of DVCF is slightly larger than that of IVCF, reaching almost 2.0 when r is larger than 0.7. This result shows that the cuckoo hash collision caused by IVCF is less than DVCF.

Figure 8A:
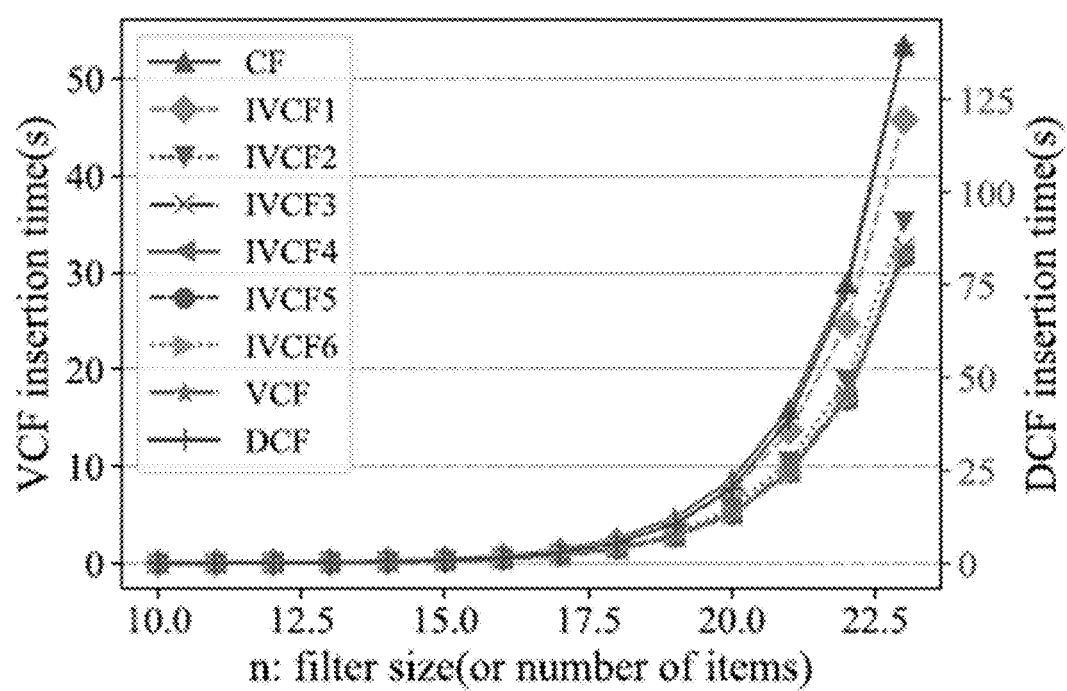
Figure 8B:
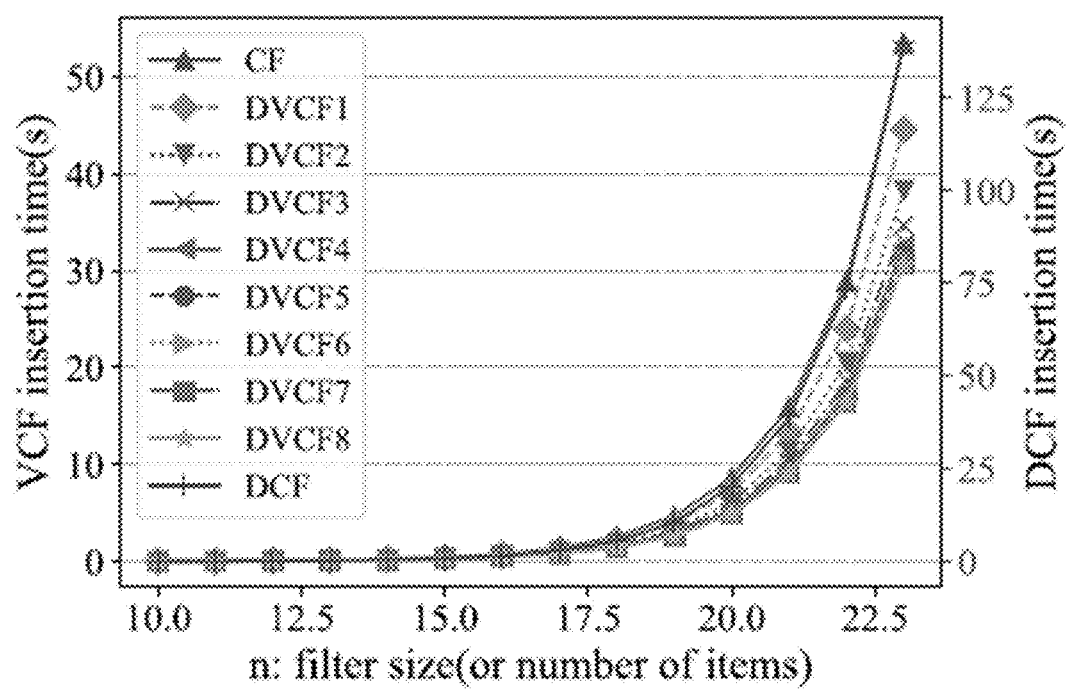
Figure 8C:
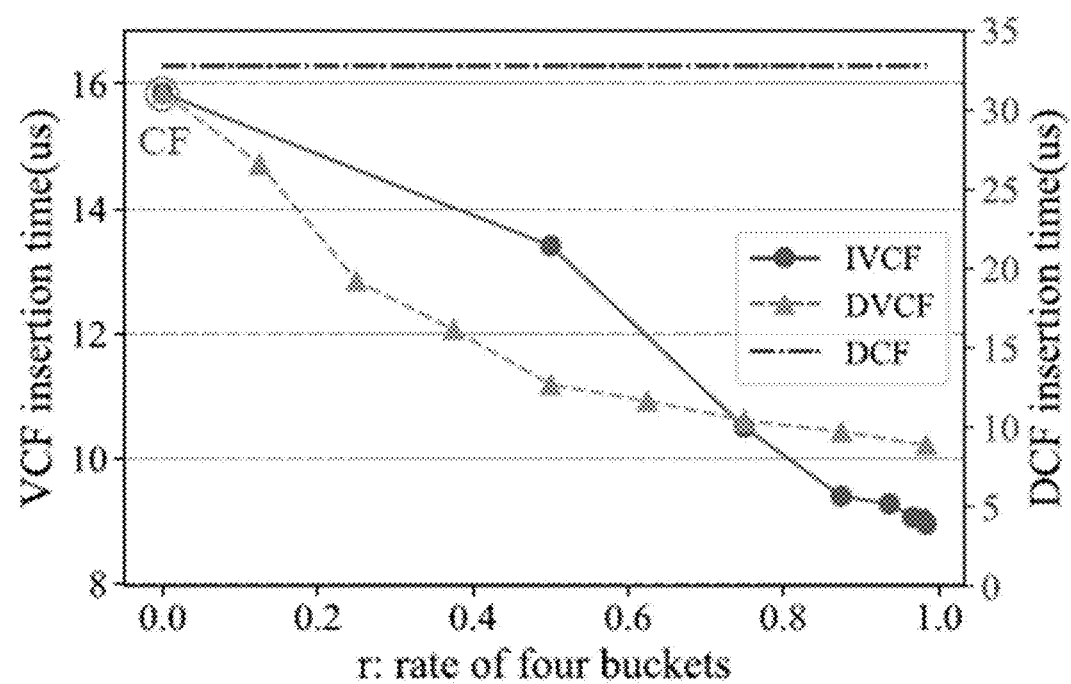
Figure 9:
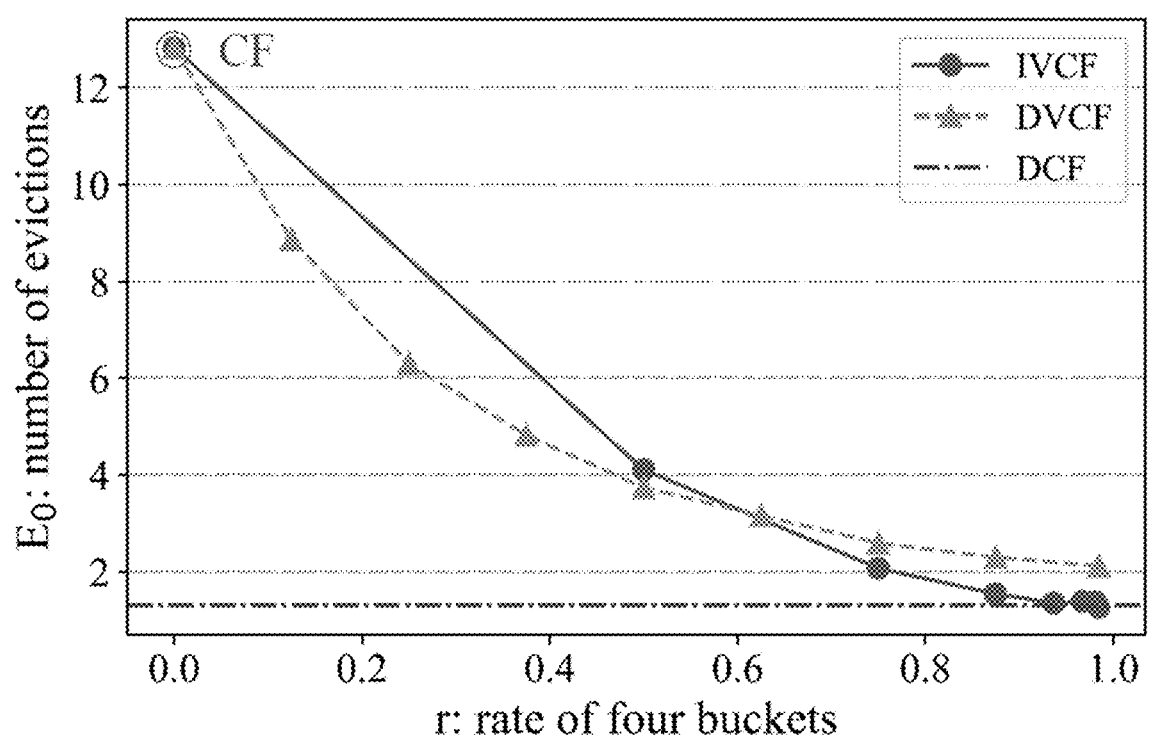
FIG. 9 illustrates an exemplary graph for eviction rate, in accordance with an embodiment of the present disclosure.

FIG. 8A-8C further illustrates the insertion performance by quantifying the insertion time. VCF may nearly cut the insertion time by half, compared to CF. The reason is that VCF reduces unnecessary fingerprint reallocation and hash computation by indexing more candidate buckets for each item. In FIG. 8C, for each item insertion, IVCF takes about 10% less time than DVCF when r>0.8. Although DCF also reduces the evictions, it consumes twice as much time as VCF due to its complex indexing algorithm.

False Positives

A new dataset, D, may be constructed, which is composed of $2^{20}$ items that are also randomly chosen from our experimental dataset. Note that the items in D are not inserted into the filters. So the ratio of the positive query results, i.e., $\xi'$ represents the false positive rate of the filter.

Figure 10:
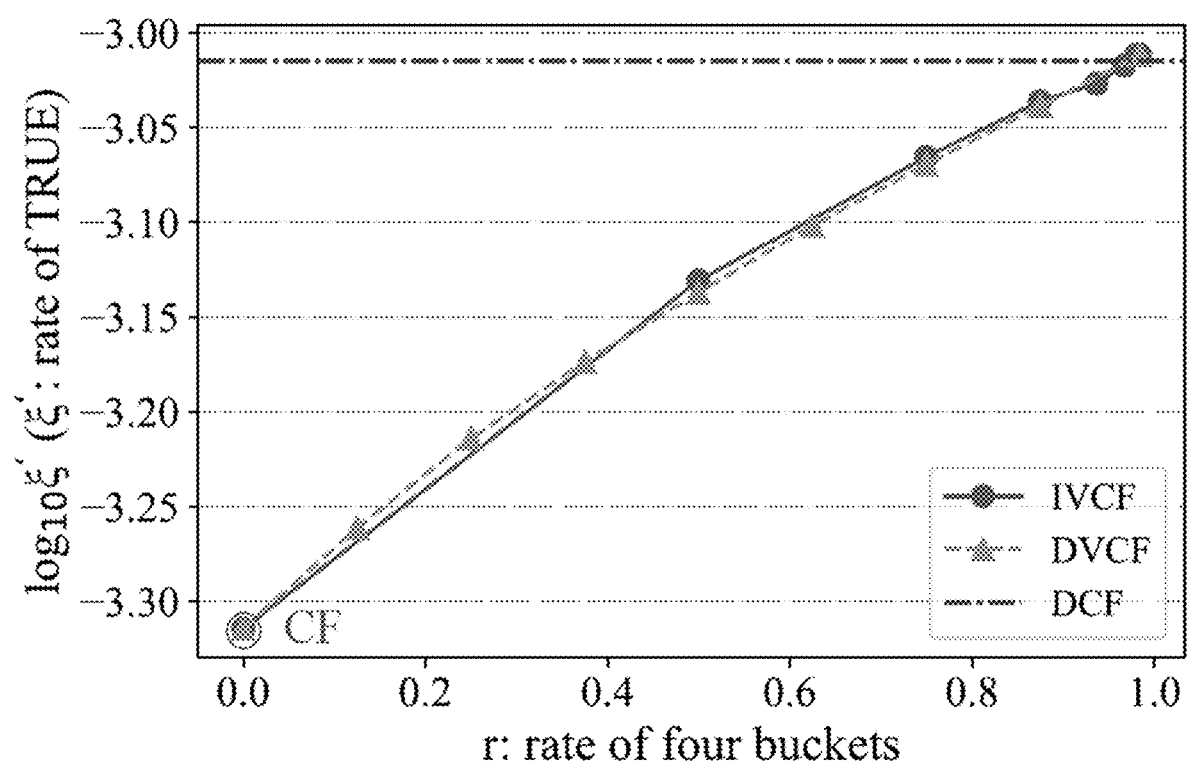
FIG. 10 illustrates an exemplary graph for false positive rate, in accordance with an embodiment of the present disclosure.

FIG. 10 shows the linear relationship between $\xi'$ and r. The false positive rate of IVCF and DVCF are similar. Both of them increase with the growth of r. The reason is that VCFs need to check more candidate buckets than CF, which increases the probability of fingerprint collisions.

The false positive rate with respect to the r, when the filter size is set as 2^20.

Impact of Parameters in VCF

Extensive experiments were conducted to quantify the impact of parameters in VCFs. First, the total insertion time consumed by these filters is compared with different hash functions: FNV hash, MurmurHash, and DJBHash. Setting r of IVCF and DVCF to the maximum, the experimental results are summarized in Table IV.

TABLE IV

TIME OVERHEAD OF VCFS WITH DIFFERENT HASH FUNCTIONS.

| | CF | IVCF | DVCF |
|---|---|---|---|
| FNV hash | 44.6 s | 26.7 s | 26.1 s |
| MurmurHash | 67.7 s | 48.2 s | 48.5 s |
| DJBHash | 38.2 s | 20.1 s | 19.6 s |

Table IV shows that our VCF methods outperform the standard CF in terms of insertion time even when different hash functions are employed. Compared with CF, the insertion time is reduced by half when using the FNV hash and DJBHash. However, this advantage is somehow degraded when using MurmurHash. This phenomenon implies that different hash functions lead to diverse performance for VCFs.

The load factor and the total insertion time consumed by k-VCFs with different k is also compared. Specifically, the fingerprint length is fixed as 16 bits, the reallocations threshold is set as 0, and k is varied from 2 to 10. Table V shows the experimental results of space utilization and total insertion time consumption of k-VCFs. Even without reallocations, the load factor of k-VCF achieves nearly 97% when k≥9. The result also shows that a larger k may help k-VCF to achieve a higher load factor at the cost of longer time consumption.

TABLE V

THE COMPARISON OF LOAD FACTOR AND INSERTION TIME CONSUMPTION WITH DIFFERENT k IN k-VCFs.

| k | 2 | 4 | 5 | 6 | 7 | 8 | 9 | 10 |
|---|---|---|---|---|---|---|---|---|
| α (%) | 88.7 | 94.0 | 95.1 | 95.7 | 96.3 | 96.7 | 96.9 | 96.8 |
| time (s) | 17.7 | 18.7 | 20.4 | 23.0 | 20.4 | 22.4 | 24.0 | 22.0 |

CONCLUSION

This paper reports VCF, a novel variant of Cuckoo Filter, targeting insertion-intensive scenarios such as online applications. VCF provides more candidate buckets to each item by utilizing vertical hashing. The Vertical Cuckoo Filter improves the standard Cuckoo filter in three ways: 1) higher load factors and less space overhead; 2) better insertion performance; 3) more flexible trade-off strategies to fit the dynamic requirement. Besides, VCF provides a methodology using one hash function for many sketches rather than independent hash functions. With the accurate representation and constant-time lookup/insertion features inherited from CF, VCF improves insertion throughput for frequent insertion and deletion.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible considering the said teachings or may be acquired from practicing the disclosed embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the said-described embodiments, but instead is defined by the appended claims considering their full scope of equivalents.

REFERENCE LIST

[1] B. H. Bloom, "Space/time trade-offs in hash coding with allowable errors," Commun. ACM, vol. 13, no. 7, pp. 422-426, 1970.

[2] L. Fan, P. Cao, J. M. Almeida, and A. Z. Broder, "Summary cache: A scalable wide-area web cache sharing protocol," in Proc. of ACM SIGCOMM, Aug. 31-Sep. 4, 1998, Vancouver, B. C., Canada, G. Neufeld, G. S. Delp, J. Smith, and M. Steenstrup, Eds., pp. 254-265.

[3] F. Bonomi, M. Mitzenmacher, R. Panigrahy, S. Singh, and G. Varghese, "An improved construction for counting bloom filters," in Proc. of ESA, Sep. 11-13, 2006, Zurich, Switzerland, vol. 4168, pp. 684-695.

[4] M. A. Bender, M. Farach-Colton, R. Johnson, R. Kraner, B. C. Kuszmaul, D. Medjedovic, P. Montes, P. Shetty, R. P. Spillane, and E. Zadok, "Don't thrash: How to cache your hash on flash," Proc. VLDB Endow., vol. 5, no. 11, pp. 1627-1637, 2012.

[5] B. Fan, D. G. Andersen, M. Kaminsky, and M. Mitzenmacher, "Cuckoo filter: Practically better than bloom," in Proc. of ACM, CoNEXT 2014, Sydney, Australia, Dec. 2-5, 2014, A. Seneviratne, C. Diot, J. Kurose, A. Chaintreau, and L. Rizzo, Eds., pp. 75-88.

[6] M. Mitzenmacher, S. Pontarelli, and P. Reviriego, "Adaptive cuckoo filters," in Proc. of ALENEX, New Orleans, La., USA, Jan. 7-8, 2018, R. Pagh and S. Venkatasubramanian, Eds., pp. 36-47.

[7] L. Luo, D. Guo, O. Rottenstreich, R. T. B. Ma, X. Luo, and B. Ren, "The consistent cuckoo filter," in Proc. of IEEE INFOCOM, Paris, France, Apr. 29-May 2, 2019, pp. 712-720.

[8] H. Chen, L. Liao, H. Jin, and J. Wu, "The dynamic cuckoo filter," in Proc. of IEEE, ICNP, Toronto, ON, Canada, Oct. 10-13, 2017, pp. 1-10.

[9] D. Eppstein, "Cuckoo filter: Simplification and analysis," in Proc. Of SWAT, Jun. 22-24, 2016, Reykjavik, Iceland, ser. LIPIcs, R. Pagh, Ed., vol. 53, pp. 8:1-8:12.

[10] M. Wang, M. Zhou, S. Shi, and C. Qian, "Vacuum filters: More space efficient and faster replacement for bloom and cuckoo filters," Proc. VLDB Endow., vol. 13, no. 2, pp. 197-210, 2019.

[11] A. D. Breslow and N. Jayasena, "Morton filters: fast, compressed sparse cuckoo filters," VLDB J., vol. 29, no. 2-3, pp. 731-754, 2020. [12] F. Wang, H. Chen, L. Liao, F. Zhang, and H. Jin, "The power of better choice: Reducing relocations in cuckoo filter," in Proc. of IEEE ICDCS, Dallas, Tex., USA, Jul. 7-10, 2019, pp. 358-367.

[13] Z. Xie, W. Ding, H. Wang, Y. Xiao, and Z. Liu, "D-ary cuckoo filter: A space efficient data structure for set membership lookup," in Proc. Of IEEE, ICPADS, Shenzhen, China, Dec. 15-17, 2017, pp. 190-197.

[14] B. K. Debnath, S. Sengupta, J. Li, D. J. Lilja, and D. H. Du, "Bloomflash: Bloom filter on flash-based storage," in Proc. of ICDCS, Minneapolis, Minn., USA, Jun. 20-24, 2011, pp. 635-644.

[15] L. Luo, D. Guo, R. T. B. Ma, O. Rottenstreich, and X. Luo, "Optimizing bloom filter: Challenges, solutions, and comparisons," IEEE Commun. Surv. Tutorials, vol. 21, no. 2, pp. 1912-1949, 2019.

[16] A. Z. Broder and M. Mitzenmacher, "Using multiple hash functions to improve IP lookups," in Proc. of IEEE INFOCOM, Alaska, USA, Apr. 22-26, 2001, pp. 1454-1463.

[17] Y. Lu, B. Prabhakar, and F. Bonomi, "Perfect hashing for network applications," in Proc. of IEEE ISIT, The Westin Seattle, Seattle, Wash., USA, Jul. 9-14, 2006, pp. 2774-2778.

[18] B. Fan, D. G. Andersen, and M. Kaminsky, "Memc3: Compact and concurrent memcache with dumber caching and smarter hashing," in Proc. of USENIX NSDI, Lombard, Ill., USA, Apr. 2-5, 2013, N. Feamster and J. C. Mogul, Eds., pp. 371-384.

[19] G. Cormode and S. Muthukrishnan, "An improved data stream summary: the count-min sketch and its applications," J. Algorithms, vol. 55, no. 1, pp. 58-75, 2005.

[20] A. Shrivastava, A. C. König, and M. Bilenko, "Time adaptive sketches (ada-sketches) for summarizing data streams," in Proc. of SIGMOD, San Francisco, Calif., USA, Jun. 26-Jul. 1, 2016, F. O zcan, G. Koutrika, and S. Madden, Eds., pp. 1417-1432.

[21] P. Zuo, Y. Hua, and J. Wu, "Level hashing: A high-performance and flexible-resizing persistent hashing index structure," ACM Trans. Storage, vol. 15, no. 2, pp. 13:1-13:30, 2019.

[22] Y. Sun, Y. Hua, Z. Chen, and Y. Guo, "Mitigating asymmetric read and write costs in cuckoo hashing for storage systems," in Proc. of USENIX ATC, Renton, Wash., USA, Jul. 10-12, 2019, D. Malkhi and D. Tsafrir, Eds., pp. 329-344.

What is claimed is:

1. A system for streaming data items of a streaming application via a Vertical Cuckoo Filter (VCF), comprising:
one or more computers communicating with a provider via a network;
wherein the one or more computers comprises:
a processor; and
a storage device coupled to the processor,
wherein the storage device is configured to store the VCF, an insert module, a lookup module, and a delete module,
the VCF comprises buckets with one or more slots and comprises at least two bitmasks,
the insert module is configured to perform an insert operation of a first fingerprint of a first item from the provider on the VCF,
the lookup module is configured to perform a lookup operation of a second fingerprint of a second item from the provider on the VCF,
the delete module is configured to perform a delete operation of a third fingerprint of a third item from the VCF,
four or more candidate buckets are associated with each item of the first item, the second item, and the third item,
the four or more candidate buckets are determined based on the at least two bitmasks, a first hash of the first item, the second item, and the third item, and a second hash of the first fingerprint, the second fingerprint, and the third fingerprint, and the VCF utilizes vertical hashing to implement cyclical access to the four or more candidate buckets, thereby improving a reallocation process of the insertion operation by reducing a number of hash computations required by item insertion;

insert operation comprises:
   calculating the first fingerprint:
   determining a first set of four candidate buckets of the first item; and
   inserting the first fingerprint into an empty slot of a candidate bucket of the first set; and
   the first set of four candidate buckets is determined according to:

$B_1(x)$=hash(x), $B_2(x)=B_1(x) \oplus \text{hash}(\eta_x) \wedge \text{bm}_1$, $B_3(x)=B_1(x) \oplus \text{hash}(\eta_x) \wedge \text{bm}_2$, $B_4(x)=B_1(x) \oplus \text{hash}(\eta_x)$, where x is the first item, $B_1(x)$, $B_2(x)$, $B_3(x)$ and $B_4(x)$ are the candidate buckets, $\eta_x$ is the first fingerprint, $\text{bm}_1$ is a first bitmask, $\text{bm}_2$ is a second bitmask, $\oplus$ is an XOR operator, and $\wedge$ is an AND operator.

2. The system of claim 1, wherein the insert operation further comprises:
   determining that each candidate bucket of the first set is full;
   randomly selecting a target candidate bucket from the first set;
   randomly selecting a target slot from the target candidate bucket;
   removing a victim fingerprint associated with a victim item from the target slot;
   inserting the first fingerprint into the target slot; and
   reallocating the victim fingerprint according to the reallocation process;
   wherein the reallocating comprises:
   determining a victim set of four candidate buckets; and
   performing the insert operation with the victim fingerprint and the victim set.

3. The system of claim 2, wherein the victim set of four candidate buckets is determined according to:

$B_m=B_i \oplus \text{hash}(\eta_x) \wedge \text{bm}_1$, $B_n=B_i \oplus \text{hash}(\eta_x) \wedge \text{bm}_2$, $B_j=B_i \oplus \text{hash}(\eta_x)$, where $B_i$ is the target candidate bucket, ix is the victim fingerprint, $B_m$, $B_n$ and $B_j$ are candidate buckets of the victim set, $\text{bm}_1$ is the first bitmask, $\text{bm}_2$ is the second bitmask, $\oplus$ is the XOR operator, and $\wedge$ is the AND operator.

4. The system of claim 1, wherein the lookup operation comprises:
   calculating the second fingerprint;
   determining a second set of four candidate buckets of the second item;
   searching the second set for the second fingerprint; and
   returning a result of the searching.

5. The system of claim 4, wherein the delete operation comprises:
   calculating the third fingerprint;
   determining a third set of four candidate buckets of the third item;
   searching the third set for the third fingerprint; and
   removing a copy of the third fingerprint from the VCF.

6. The system of claim 5, wherein more than four candidate buckets are associated with the each item.

7. The system of claim 6, wherein the more than four candidate buckets are determined according to:

$B_1(x)$=hash(x), $B_2(x)=B_1(x) \oplus \text{hash}(\eta_x) \wedge \text{bm}_1$, $B_3(x)=B_1(x) \oplus \text{hash}(\eta_x) \wedge \text{bm}_2$, $B_{k-1}(x)=B_1(x) \oplus \text{hash}(\eta_x) \wedge \text{bm}_{k-2}$, $B_k(x)=B_1(x) \oplus \text{hash}(\eta_x)$, where $B_{k-1}(x)$ is a second to last candidate bucket, $B_k(x)$ is a last candidate bucket, and $\text{bm}_{k-2}$ is a last bitmask.

8. The system of claim 5, wherein the first bitmask is an inverse of the second bitmask.

9. The system of claim 8, wherein the first bitmask is 11110000 and the second bitmask is 00001111.

10. The system of claim 8, wherein the first bitmask comprises 1 0s and the second bitmask comprises f–1 0s, where f is the length of the first fingerprint.

11. The system of claim 5, wherein a value range of the hash($\eta_x$) is separated into a first interval and a second interval according to a threshold.

12. The system of claim 11, wherein the first interval comprises [T/2–Δt, T/2+Δt] and the second interval comprises [0, T/2–Δt]∪[T/2+Δt, T], where T is the length of the value range of the hash($\eta_x$) and Δt is the threshold.

13. The system of claim 12, wherein when the first fingerprint lies in the second interval and the input module is further configured to determine a first set of two candidate buckets and insert the first fingerprint into a candidate bucket of the first set of two candidate buckets.

14. The system of claim 12, wherein the second fingerprint lies in the second interval and the lookup module is further configured to determine a second set of two candidate buckets and search the second set of two candidate buckets for the second fingerprint.

15. The system of claim 12, wherein when the third fingerprint lies in the second interval and the delete module is further configured to determine a third set of two candidate buckets and delete the third fingerprint from a candidate bucket of the third set of two candidate buckets.

16. The system of claim 1, wherein the first fingerprint, the second fingerprint, and the third fingerprint are calculated according to:

$\eta_x = h_0(x) \bmod 2^f$, where $\eta_x$ is the first fingerprint, the second fingerprint, or the third fingerprint, $h_0(x)$ is a hash of the first item, the second item, or the third item, and f is the length of the first fingerprint, the second fingerprint, or the third fingerprint.

17. The system of claim 1, wherein the four or more candidate buckets are circularly accessible.

18. The system of claim 1, wherein the VCF utilizes Fowler-Noll-Vo (FNV) hash.

* * * * *